United States Patent
Woodworth et al.

(10) Patent No.: US 9,677,564 B1
(45) Date of Patent: Jun. 13, 2017

(54) MAGNETIC PROPELLER SAFETY DEVICE

(71) Applicant: X Development LLC, Mountain View, CA (US)

(72) Inventors: Adam Woodworth, Santa Clara, CA (US); Clark Sopper, Redwood City, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 14/598,009

(22) Filed: Jan. 15, 2015

(51) Int. Cl.
| | | |
|---|---|---|
| *B64D 35/00* | (2006.01) |
| *F04D 25/02* | (2006.01) |
| *B64C 39/02* | (2006.01) |
| *B64D 45/00* | (2006.01) |

(52) U.S. Cl.
CPC .......... *F04D 25/026* (2013.01); *B64C 39/024* (2013.01); *B64D 45/00* (2013.01); *B64C 2201/165* (2013.01)

(58) Field of Classification Search
CPC ................. F04D 25/026; B64C 39/024; B64C 2201/165; B64D 45/00
See application file for complete search history.

(56) References Cited

U.S. PATENT DOCUMENTS

| | | | | |
|---|---|---|---|---|
| 3,458,122 A | * | 7/1969 | Andriussi | F01P 7/081 310/103 |
| 6,634,476 B2 | * | 10/2003 | Inoue | F16D 27/112 192/113.23 |
| 7,037,038 B1 | * | 5/2006 | Haski | B63B 35/32 210/242.1 |
| 7,128,690 B2 | * | 10/2006 | Inoue | F16D 27/112 477/175 |
| 8,100,205 B2 | | 1/2012 | Gettings et al. | |
| 8,312,977 B2 | | 11/2012 | Melz et al. | |
| 8,393,338 B2 | | 3/2013 | Wyatt et al. | |
| 8,439,763 B2 | | 5/2013 | Bosk | |
| 2014/0138477 A1 | | 5/2014 | Keennon et al. | |
| 2014/0319272 A1 | | 10/2014 | Casado Magana et al. | |

* cited by examiner

*Primary Examiner* — Philip J Bonzell
(74) *Attorney, Agent, or Firm* — McDonnell Boehren Hulbert & Berghoff LLP

(57) ABSTRACT

A magnetic propeller device for an unmanned aerial vehicle (UAV) includes a propeller and a shaft mount that engage with a motor shaft of a UAV. The propeller and shaft mount each have a magnetic element. When both magnetic elements are aligned, the propeller engages the shaft mount by way of a magnetic holding force between the magnetic elements. When a propeller contacts an object and the propeller is displaced, the magnetic elements passively disengage the propeller from the shaft mount due to misalignment of the magnetic elements. Passive disengagement allows the propeller to rotate independently of the motor shaft. Once the UAV moves clear of the object, the magnetic elements can realign, such that the propeller re-engages the shaft mount and resumes rotation with the motor shaft.

21 Claims, 14 Drawing Sheets

MAGNETIC PROPELLER SAFETY DEVICE

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode.

When an unmanned vehicle operates in a remote-control mode, a pilot or driver that is at a remote location can control the unmanned vehicle via commands that are sent to the unmanned vehicle via a wireless link. When the unmanned vehicle operates in autonomous mode, the unmanned vehicle typically moves based on pre-programmed navigation waypoints, dynamic automation systems, or a combination of these. Further, some unmanned vehicles can operate in both a remote-control mode and an autonomous mode, and in some instances may do so simultaneously. For instance, a remote pilot or driver may wish to leave navigation to an autonomous system while manually performing another task, such as operating a mechanical system for picking up objects, as an example.

When an unmanned aerial vehicle (UAV) propelled by spinning rotors is operating in the vicinity of other objects, there is a risk of damage to the UAV and/or other objects. This, UAVs may be designed so as to reduce the risk of a UAV's propeller contacting objects during operation.

Some existing UAVs include features such as shrouds, ducts, and cages, which aim to shield propellers and thus make the UAVs safer. However, cages, shrouds, and ducts can have undesirable aerodynamic characteristics. Further, these features can require additional fabrication, which can increase the time and cost of manufacturing a UAV. Additionally, the added weight of a cage, shroud, and/or duct requires additional flight power and reduces flight time.

Another existing safety feature is a "prop saver." A prop saver typically includes a small rubber O-ring attached to the propeller. The prop saver allows displacement of the propeller by 10-20° during an object strike before ejecting the propeller. The prop saver dampens the forces imparted on the propeller and object when contact occurs. After the propeller has displaced 10-20°, the propeller is ejected from the UAV, and UAV flight is discontinued. While the dampened object strike force resulting from the prop saver reduces damage to contact between the object and propeller, a prop saver may terminate UAV flight.

SUMMARY

Ideally, a solution for a propeller safety device would improve upon the drawbacks of current propeller safety devices. Specifically, a propeller safety device that can, in the event of contacting an object, reduce damage to the object, propeller, and UAV, while permitting UAV flight to continue would be an improvement over existing propeller safety devices. A magnetic propeller safety device may improve upon the drawbacks of current propeller safety devices. Furthermore, a magnetic propeller device according to example embodiments may allow for flight to continue, even after the propeller contacts an object.

The magnetic propeller safety device includes a propeller and a shaft mount that engage with a motor shaft of a motor for a UAV. The propeller is attached to the shaft mount, which is coupled to the motor shaft. The propeller and shaft mount each have a magnetic element. When both magnetic elements are aligned, the propeller engages the shaft mount by way of a magnetic holding force between the magnetic elements. During a propeller object strike, when the propeller displaces 5 to 10°, the magnetic elements passively disengage the propeller from the shaft mount due to misalignment of the magnetic elements. Passive disengagement allows the propeller to rotate independently of the motor shaft. During the propeller object strike, the propeller remains attached to the shaft mount. Once the propeller object strike finishes, when the magnetic elements are realigned, the attached propeller re-engages the shaft mount and rotates with the motor shaft. Passive disengagement of the propeller from the shaft mount reduces object strike damage to the object, propeller, and UAV. Also, UAV flight may continue after a propeller object strike because the propeller remains attached to the shaft mount.

In a first aspect, an aerial vehicle including at least one propeller; a shaft mount inserted through a center of the propeller, the shaft mount configured to physically couple and rotate with a motor shaft of an aerial vehicle, the shaft mount configured to engage the propeller to rotate with the motor shaft, the shaft mount configured to remain inserted through the center of the propeller; a first magnetic element incorporated with the propeller; and a second magnetic element incorporated with the shaft mount, wherein the second magnetic element is configured to attract the first magnetic element to engage the propeller to the shaft mount.

In a second aspect, a propeller system including a propeller; a shaft mount inserted through a center of the propeller, the shaft mount configured to physically couple and rotate with a motor shaft of an aerial vehicle, the shaft mount configured to engage the propeller to rotate with the motor shaft, the shaft mount configured to remain inserted through the center of the propeller; a first magnetic element incorporated with the propeller; and a second magnetic element incorporated with the shaft mount, wherein the second magnetic element is configured to attract the first magnetic element to engage the propeller to the shaft mount.

In a third aspect, an aerial vehicle including a plurality of propeller systems including a first propeller system and a second propeller system, wherein each propeller system includes a propeller; a shaft mount inserted through a center of the propeller, the shaft mount configured to physically couple and rotate with a motor shaft of an aerial vehicle, the shaft mount configured to engage the propeller to rotate with the motor shaft, the shaft mount configured to remain inserted through the center of the propeller; a first magnetic element incorporated with the propeller; and a second magnetic element incorporated with the shaft mount, wherein the second magnetic element is configured to attract the first magnetic element to engage the propeller to the shaft mount when the first magnetic element and the second magnetic element are aligned, wherein the propeller disengages the shaft mount when the first magnetic element and second magnetic element are misaligned; one or more processors; and a memory storing executable instructions.

These, as well as other aspects, alternatives, and advantages, will become apparent to those of ordinary skill in the art by reading the following detailed description, with reference where appropriate to the accompanying drawings.

DETAILED DESCRIPTION

Figure 1:
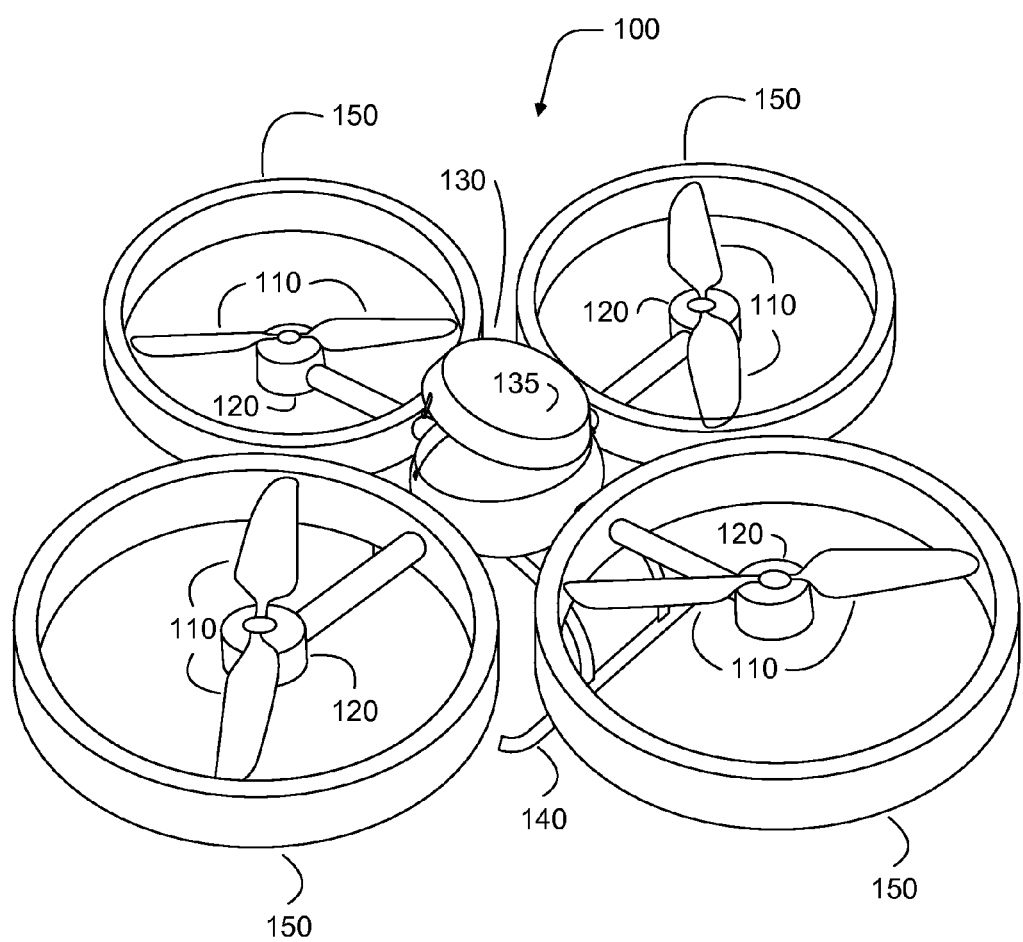
FIGS. 1, 2, 3A, and 3B are simplified illustrations of unmanned aerial vehicles, according to example embodiments.

In the following detailed description, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

I. OVERVIEW

Ideally, a solution for a propeller safety device would improve the drawbacks of current propeller safety devices. Specifically, a propeller safety device that can, in the event of a propeller contacting an object, prevent or at least reduce damage to the object, propeller, and UAV, while permitting UAV to move away from the object and continue its flight, is desirable.

A magnetic propeller safety device according to an example embodiment may offer several advantages. For instance, a magnetic propeller safety device may improve safety for nearby objects, the propeller, and the UAV. Further, an example magnetic propeller safety device may allow the UAV to continue flight during and after a propeller object strike. Yet further, the magnetic propeller safety device may reduce the force required to install the propeller. Additionally or alternatively, the magnetic propeller safety device may make it harder to remove the propeller by increasing the retention force on the propeller.

In an example embodiment, magnets may serve as a passive clutch between the propeller and the motor shaft, which disengages the propeller in the event of a propeller strike. Specifically, when a propeller strikes an object and displaces 5-10°, the magnets are arranged to passively disengage the propeller from the motor shaft. When disengaged, a propeller can rotate independently of the motor shaft. Because the disengaged propeller can rotate independently from the shaft upon disengaging, the cumulative object strike forces imparted on the propeller, object, and shaft may be reduced, which in turn may reduce damage to the propeller, object, and UAV.

Such a configuration with magnetically couplings between propellers and motor shafts also may permit UAV flight to continue after an object strike. In particular, during an object strike, a propeller may continue spinning, albeit independently from the motor shaft. Alternatively, if the struck object prevents the propeller form rotating, then the propeller may stop rotating while the shaft mount and motor shaft continue to rotate. However, once the object strike ends, the magnets reengage the propeller to the motor shaft such that the propeller resumes rotating in conjunction with the motor shaft. Because the magnets reengage the propeller to the motor shaft, the magnets may allow UAV flight to continue after the object strike. Specifically, for a UAV with one propeller, propeller reengagement with the motor shaft may allow UAV flight to continue after the object strike.

For a UAV with multiple propellers, if one of the propellers disengages from its corresponding shaft mount due to a propeller object strike, the remaining unaffected propellers may permit the UAV to continue flight during the object strike. Alternatively, the UAV may require all propellers to be engaged for UAV flight to continue. In this case, the reengagement of the disengaged propeller to its corresponding shaft mount after the propeller object strike may permit the UAV to continue flight after the object strike.

Additionally, the magnets may reduce the force required to install the propeller and increase the force required to remove the propeller. In particular, a normal magnetic holding force imparted between the propeller and a shaft mount reduces the installation force for the propeller. Furthermore, the same normal magnetic holding force increases the force required to remove the propeller. As a result, the magnets make it easier to install the propeller. The magnets also increase the retention force imparted on the installed propeller. By taking advantage of the differences in normal force versus tangential force for magnets, a magnetic propeller safety device offers benefits that current propeller safety devices fail to provide.

A magnetic propeller safety device includes various components. In one embodiment, the propeller assembly includes a motor shaft, a shaft mount, a propeller, a first magnetic element, and a second magnetic element. The first magnetic element is incorporated into the propeller while the second magnetic element is incorporated into the shaft mount. The shaft mount includes a mounting plate and a press fit locking end. The magnetic element of the shaft mount is incorporated into the mounting plate. The motor shaft can be inserted into the shaft mount. The shaft mount is then inserted through the center of the propeller. The propeller has a round hole located at the center of the propeller to accommodate the shaft mount.

The shaft mount affects propeller motion via the press fit locking end, the mounting plate, and the magnetic element for the shaft mount. The press fit locking end can be compressed for insertion into the propeller hole. Once the press fit locking end clears the hole of the propeller, the press fit locking end expands and snaps into place to serve as a locking mechanism that prevents the propeller from ejecting off of the shaft mount and shaft during UAV flight. While the press fit locking end is located on one side of the propeller after insertion, the mounting plate of the shaft mount is on the other side of the propeller. Thus, after insertion, the propeller is located between the mounting plate and the press fit locking end. The propeller can move between the mounting plate and the press fit locking end along the shaft mount.

When the propeller is engaged with the shaft mount, the mounting plate and magnetic elements affect the movement of the propeller. The magnetic element of the shaft mount is flush mounted with the mounting plate surface that contacts the propeller. The magnetic elements of the propeller and shaft mount attract each other when the magnetic elements are aligned. Alignment of the magnetic elements causes the propeller to engage the shaft mount, and thus rotate in conjunction with the motor shaft. When engaged, the propeller is in contact with the mounting plate of the shaft mount. When disengaged, the press fit locking end prevents the propeller from ejecting off the UAV.

When the propeller is passively disengaged from the shaft mount (spinning independently from the motor shaft and the shaft mount), the propeller is located roughly ⅛th of an inch from the mounting plate of the shaft mount. In some embodiments, the propeller may be pushed away $\frac{1}{8}^{th}$ of an inch due to a normal magnetic repelling force. In other embodiments, the propeller is pushed off the mounting plate by features, e.g., ramps or grooves.

While the magnetic elements of the propeller and shaft mount could contain any number of magnets, in one embodiment, each propeller blade contains one magnet. For a two-blade propeller, each magnet could be symmetrically located on each propeller blade equidistant from the center of the hole of the propeller. Thus, magnet location is symmetric relative to the center hole of the propeller. For a propeller with 3 or more blades, 3 or more magnets would be needed. Further, each blade could contain more than one magnet.

Asymmetric magnet locations on the propeller are possible. However, the weight of the magnets must be radially balanced with respect to the center of the propeller. Furthermore, the magnetic force must be equal for each blade of the propeller. Thus, counterweights may be required for an asymmetric magnet location design.

One benefit of a symmetric magnet location design is that the magnets may reengage at multiple rotation points. For example, for a two blade propeller with a symmetric magnet location design, the propeller magnets may reengage the shaft mount when the propeller has rotated either 180° or 0°. For a three blade propeller with a symmetric magnet location design, the propeller magnets may reengage the shaft mount at propeller rotation points of 0°, 120°, and 240°. However, for an asymmetric magnet location design, only one location for realignment exists at a rotation of 0°. Thus, a symmetric design encourages the propeller to reengage the shaft mount after an object strike, which improves UAV flight.

For the shaft mount, magnets may be located in the mounting plate at a position corresponding to the placement of the propeller magnets. For example, for the two-blade propeller, two magnets may be located in the mounting plate, with each magnet position corresponding to the location of a propeller magnet. This design promotes engagement of the propeller to the shaft mount via the magnetic elements of the propeller and the shaft mount.

The magnets of the mounting plate could be larger, smaller, or the same size as the magnets of the propeller. Also, the mounting plate could have more, fewer, or the same number of magnets as the propeller, as long as the shaft mount magnet locations correspond to the propeller magnet locations. For example, a shaft mount could have two magnets located in a position corresponding to a propeller location for one propeller magnet. Thus, the shaft mount would have twice as many magnets as the propeller.

The shaft mount material may be plastic, although a different material could be used. The shaft mount can be made with off-the-shelf parts. The propeller and magnetic elements may also be off-the-shelf parts. The magnets may be permanent magnets, electromagnetic magnets, or any other type of magnet that is suitable for the magnetic propeller safety device.

The magnetic elements of the propeller and the shaft mount can be tuned or adapted to impart different normal force and tangential force strengths. In one embodiment, a ratio of normal magnetic force to tangential magnetic force is 10:1. However, this ratio could be increased or decreased depending on the needs of the UAV, propeller, shaft mount, motor shaft, and/or the specific application of the magnetic elements.

One unique way to adjust the ratio is by inserting a spacer between the mounting plate and the propeller. Inserting a spacer may reduce the amount of tangential force required to overcome the magnetic holding force to disengage the propeller from the shaft mount. However, other methods of tuning or adjusting magnetic forces could also apply.

Numerous variations and embodiments relying on the same principles of the magnetic propeller safety device could be used to achieve similar benefits. For example, features (e.g., ramps, grooves, or other features) may be added to the shaft mount to speed up and/or control disengagement of the propeller from the shaft mount. The acceleration of the disengagement for ramp features would depend on the slope of the ramp. As the ramp slope increases, the propeller disengages from the shaft mount at a faster rate. Other embodiments of the magnetic propeller safety device may use ferrous, instead of magnets, for the magnetic elements. Also, other embodiments of the magnetic propeller safety device may incorporate hard stops to limit propeller rotation when the propeller disengages from the shaft mount during a propeller object strike.

The magnetic propeller safety device may be a tuned and reversible safety solution. The magnetic propeller safety device may reduce damage to the object, propeller, shaft mount, motor shaft, and UAV during an object strike. Furthermore, the magnetic propeller safety device may allow the UAV to continue flight despite an object strike. Also, the magnetic propeller safety device may make a propeller easier to attach and remove than the typical "prop saver." Lastly, the magnetic propeller safety device may reduce the amount of force needed to install the propeller and increase the retention force of the propeller within the UAV.

II. ILLUSTRATIVE UNMANNED VEHICLES

Throughout this application, the terms "unmanned aerial vehicle" and "UAV" refer to any autonomous or semi-autonomous vehicle that is capable of performing some functions without a physically-present human pilot. Examples of flight-related functions may include, but are not limited to, sensing its environment or operating in the air without a need for input from an operator, among others.

A UAV may be autonomous or semi-autonomous. For instance, some functions could be controlled by a remote human operator, while other functions are carried out autonomously. Further, a UAV may be configured to allow a remote operator to take over functions that can otherwise be controlled autonomously by the UAV. Also, a given type of function may be controlled remotely at one level of abstraction and performed autonomously at another level of abstraction. For example, a remote operator could control high level navigation decisions for a UAV, such as by specifying that the UAV should travel from one location to another (e.g., from the city hall in Palo Alto to the city hall in San Francisco), while the UAV's navigation system autonomously controls more fine-grained navigation decisions, such as the specific route to take between the two locations, specific flight controls to achieve the route and avoid obstacles while navigating the route, and so on. Other examples are also possible.

A UAV can be of various forms. For example, a UAV may take the form of a rotorcraft such as a helicopter or multicopter, a fixed-wing aircraft, a jet aircraft, a ducted fan aircraft, a lighter-than-air dirigible such as a blimp or steerable balloon, a tail-sitter aircraft, a glider aircraft, and/or an ornithopter, among other possibilities. Further, the terms "drone", "unmanned aerial vehicle system" ("UAVS"), or "unmanned aerial system" ("UAS") may also be used to refer to a UAV.

FIG. 1 is a simplified illustration of a UAV, according to an example embodiment. In particular, FIG. 1 shows an example of a rotorcraft 100 that is commonly referred to as a multicopter. Multicopter 100 may also be referred to as a quadcopter, as it includes four rotors 110. It should be understood that example embodiments may involve rotorcraft with more or less rotors than multicopter 100. For example, a helicopter typically has two rotors. Other examples with three or more rotors are possible as well. Herein, the term "multicopter" refers to any rotorcraft having more than two rotors, and the term "helicopter" refers to rotorcraft having two rotors.

Referring to multicopter 100 in greater detail, the four rotors 110 provide propulsion and maneuverability for the multicopter 100. More specifically, each rotor 110 includes blades that are attached to a motor 120. Configured as such the rotors may allow the multicopter 100 to take off and land vertically, to maneuver in any direction, and/or to hover. Furthermore, the pitch of the blades may be adjusted as a group and/or differentially, and may allow a multicopter 100 to perform three-dimensional aerial maneuvers such as an upside-down hover, a continuous tail-down "tic-toc," loops, loops with pirouettes, stall-turns with pirouette, knife-edge, immelmann, slapper, and traveling flips, among others. When the pitch of all blades is adjusted to perform such aerial maneuvering, this may be referred to as adjusting the "collective pitch" of the multicopter 100. Blade-pitch adjustment may be particularly useful for rotorcraft with substantial inertia in the rotors and/or drive train, but is not limited to such rotorcraft.

Additionally or alternatively, multicopter 100 may propel and maneuver itself by adjusting the rotation rate of the motors, collectively or differentially. This technique may be particularly useful for small electric rotorcraft with low inertia in the motors and/or rotor system, but is not limited to such rotorcraft.

Multicopter 100 also includes a central enclosure 130 with a hinged lid 135. The central enclosure may contain, e.g., control electronics such as an inertial measurement unit (IMU) and/or an electronic speed controller, batteries, other sensors, and/or a payload, among other possibilities.

The illustrative multicopter 100 also includes landing gear 140 to assist with controlled take-offs and landings. In other embodiments, multicopters and other types of UAVs without landing gear are also possible.

In a further aspect, multicopter 100 includes rotor protectors 150. Such rotor protectors 150 can serve multiple purposes, such as protecting the rotors 110 from damage if the multicopter 100 strays too close to an object, protecting the multicopter 100 structure from damage, and protecting nearby objects from being damaged by the rotors 110. It should be understood that in other embodiments, multicopters and other types of UAVs without rotor protectors are also possible. Further, rotor protectors of different shapes, sizes, and function are possible, without departing from the scope of the invention.

The magnetic propeller safety device 400 (described in further detail in FIGS. 4A-10) can be incorporated into multicopter 100. In particular, rotors 110 can be replaced or upgraded with the magnetic propeller safety device 400. The device 400 can provide additional protection against propeller object strikes causing damage to the rotors 110, damage to the multicopter 100, and damage to objects. Alternatively, the device 400 could be used in lieu of rotor protectors 150 to protect the rotors 110, device 400, multicopter 100, and objects from damage incurred from a propeller object strike.

A multicopter 100 may control the direction and/or speed of its movement by controlling its pitch, roll, yaw, and/or altitude. To do so, multicopter 100 may increase or decrease the speeds at which the rotors 110 spin. For example, by maintaining a constant speed of three rotors 110 and decreasing the speed of a fourth rotor, the multicopter 100 can roll right, roll left, pitch forward, or pitch backward, depending upon which motor has its speed decreased. Specifically, the multicopter may roll in the direction of the motor with the decreased speed. As another example, increasing or decreasing the speed of all rotors 110 simultaneously can result in the multicopter 100 increasing or decreasing its altitude, respectively. As yet another example, increasing or decreasing the speed of rotors 110 that are turning in the same direction can result in the multicopter 100 performing a yaw-left or yaw-right movement. These are but a few examples of the different types of movement that can be accomplished by independently or collectively adjusting the RPM and/or the direction that rotors 110 are spinning.

Figure 2:
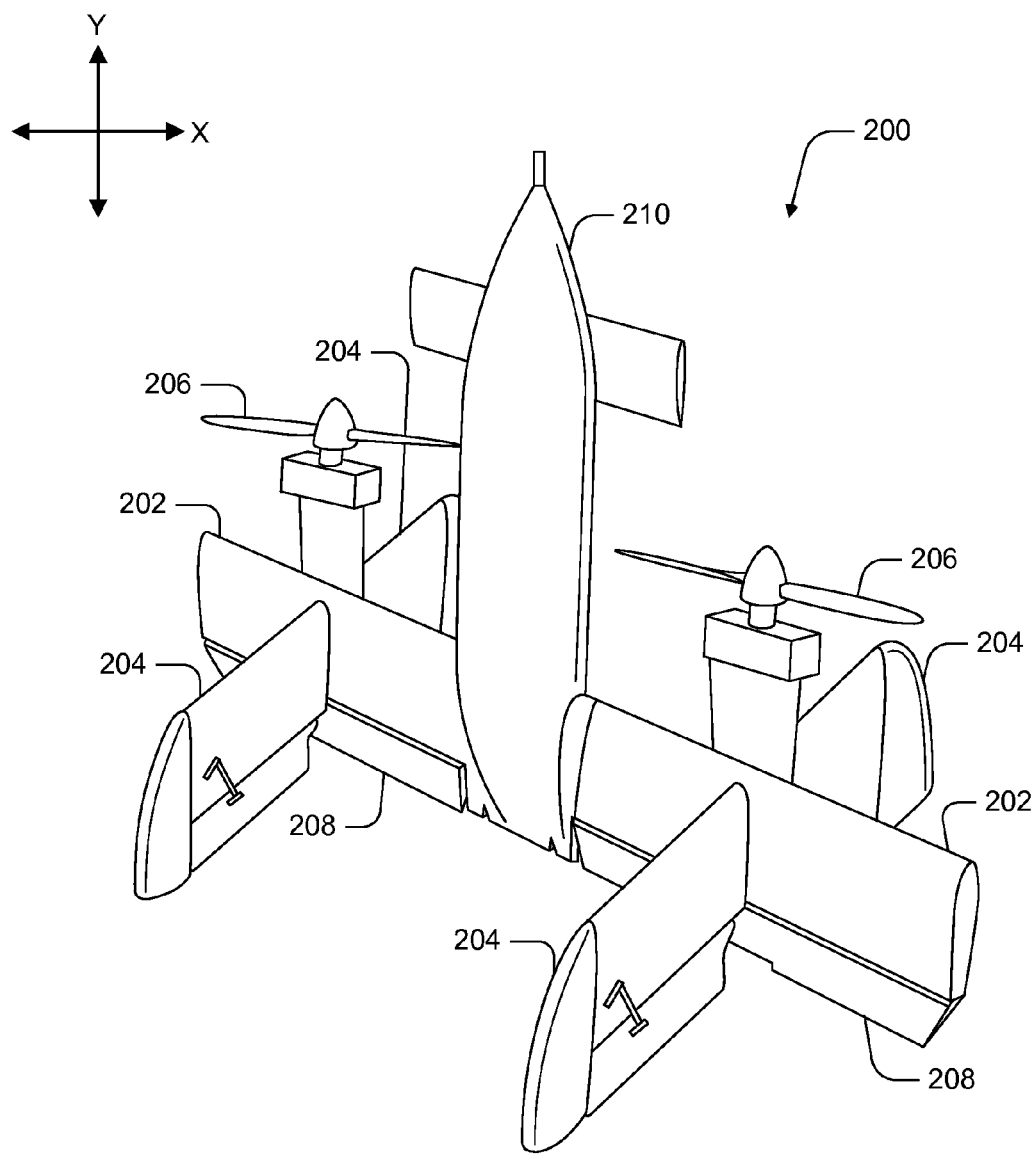

FIG. 2 is a simplified illustration of a UAV, according to an example embodiment. In particular, FIG. 2 shows an example of a tail-sitter UAV 200. In the illustrated example, the tail-sitter UAV 200 has fixed wings 202 to provide lift and allow the UAV to glide horizontally (e.g., along the x-axis, in a position that is approximately perpendicular to the position shown in FIG. 2). However, the fixed wings 202 also allow the tail-sitter UAV 200 take off and land vertically on its own.

For example, at a launch site, tail-sitter UAV 200 may be positioned vertically (as shown) with fins 204 and/or wings 202 resting on the ground and stabilizing the UAV in the vertical position. The tail-sitter UAV 200 may then take off by operating propellers 206 to generate the upward thrust (e.g., a thrust that is generally along the y-axis). Once at a suitable altitude, the tail-sitter UAV 200 may use its flaps 208 to reorient itself in a horizontal position, such that the fuselage 210 is closer to being aligned with the x-axis than the y-axis. Positioned horizontally, the propellers 206 may provide forward thrust so that the tail-sitter UAV 200 can fly in a similar manner as a typical airplane.

The magnetic propeller safety device 400 may be incorporated into propellers 206. In particular, the device 400 may replace propellers 206, or propellers 206 may be upgraded to include device 400. The device 400 can mitigate the damage incurred by propellers 206, device 400, tail sitter UAV 200, and objects during a propeller object strike.

Variations on the illustrated tail-sitter UAV 200 are possible. For instance, tail-sitters UAVs with more or less propellers, or that utilize a ducted fan or multiple ducted fans, are also possible. Further, different wing configurations with more wings (e.g., an "x-wing" configuration with four wings), with less wings, or even with no wings, are also possible. More generally, it should be understood that other types of tail-sitter UAVs and variations on the illustrated tail-sitter UAV 200 are also possible.

As noted above, some embodiments may involve other types of UAVs, in addition or in the alternative to multicopters. For instance, FIGS. 3A and 3B are simplified illustrations of other types of UAVs, according to example embodiments.

Figure 3A:
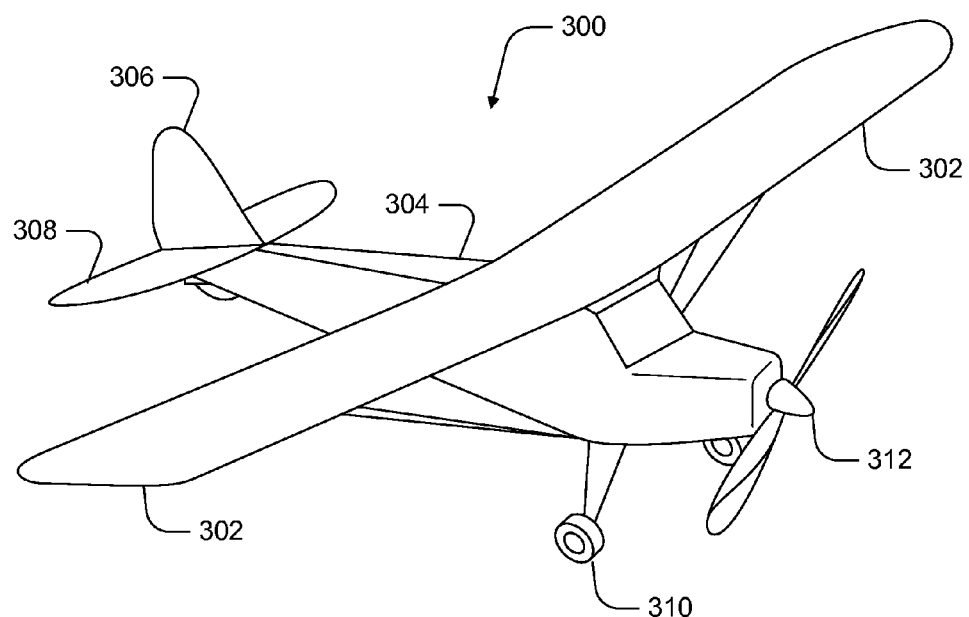

In particular, FIG. 3A shows an example of a fixed-wing aircraft 300, which may also be referred to as an airplane, an aeroplane, or simply a plane. A fixed-wing aircraft 300, as the name implies, has stationary wings 302 that generate lift based on the wing shape and the vehicle's forward airspeed. This wing configuration is different from a rotorcraft's configuration, which produces lift through rotating rotors about a fixed mast, and an ornithopter's configuration, which produces lift by flapping wings.

FIG. 3A depicts some common structures used in a fixed-wing aircraft 300. In particular, fixed-wing aircraft 300 includes a fuselage 304, two horizontal wings 302 with an airfoil-shaped cross section to produce an aerodynamic force, a vertical stabilizer 306 (or fin) to stabilize the plane's yaw (turn left or right), a horizontal stabilizer 308 (also referred to as an elevator or tailplane) to stabilize pitch (tilt up or down), landing gear 310, and a propulsion unit 312, which can include a motor, shaft, propeller, and/or the magnetic propeller device 400.

Figure 3B:
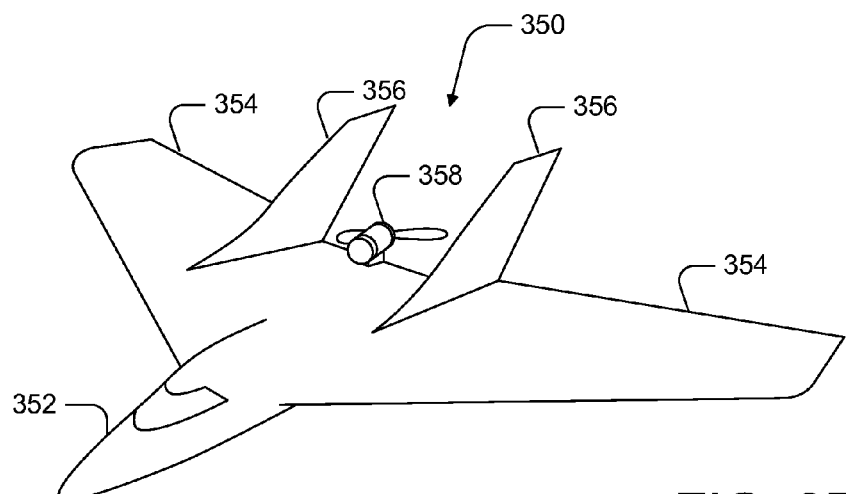

FIG. 3B shows an example of an aircraft 350 with a propeller in a pusher configuration. The term "pusher" refers to the fact that the propulsion unit 358 is mounted at the back of the aircraft and "pushes" the vehicle forward, in contrast to the propulsion unit being mounted at the front of the aircraft. Similar to the description provided for FIG. 3A, FIG. 3B depicts common structures used in the pusher plane: a fuselage 352, two horizontal wings 354, vertical stabilizers 356, and a propulsion unit 358, which can include a motor, shaft, propeller, and/or the magnetic propeller safety device 400. In both FIGS. 3A and 3B, the device 400 can mitigate the damage incurred by propellers, device 400, objects, and aircrafts 300 and 350 during a propeller object strike.

UAVs can be launched in various ways, using various types of launch systems (which may also be referred to as deployment systems). A very simple way to launch a UAV is a hand launch. To perform a hand launch, a user holds a portion of the aircraft, preferably away from the spinning rotors, and throws the aircraft into the air while contemporaneously throttling the propulsion unit to generate lift.

Rather than using a hand launch procedure in which the person launching the vehicle may be exposed to risk from the quickly spinning propellers, a stationary or mobile launch station can be utilized. For instance, a launch system can include supports, angled and inclined rails, and a backstop. The aircraft begins the launch system stationary on the angled and inclined rails and launches by sufficiently increasing the speed of the propeller to generate forward airspeed along the incline of the launch system. By the end of the angled and inclined rails, the aircraft can have sufficient airspeed to generate lift. As another example, a launch system may include a rail gun or cannon, either of which may launch a UAV by thrusting the UAV into flight. A launch system of this type may launch a UAV quickly and/or may launch a UAV far towards the UAV's destination. Other types of launch systems may also be utilized.

In some cases, there may be no separate launch system for a UAV, as a UAV may be configured to launch itself. For example, a "tail sitter" UAV typically has fixed wings to provide lift and allow the UAV to glide, but also is configured to take off and land vertically on its own. Other examples of self-launching UAVs are also possible.

The UAVs discussed in FIGS. 1-3B are only examples of UAVs in which the magnetic propeller safety device 400 could be used. The device 400 could be incorporated into other UAVs, aircrafts, or vehicles. The device 400 may also be used in different applications, other than those described herein.

III. ILLUSTRATIVE COMPONENTS OF A UAV

Figure 3C:
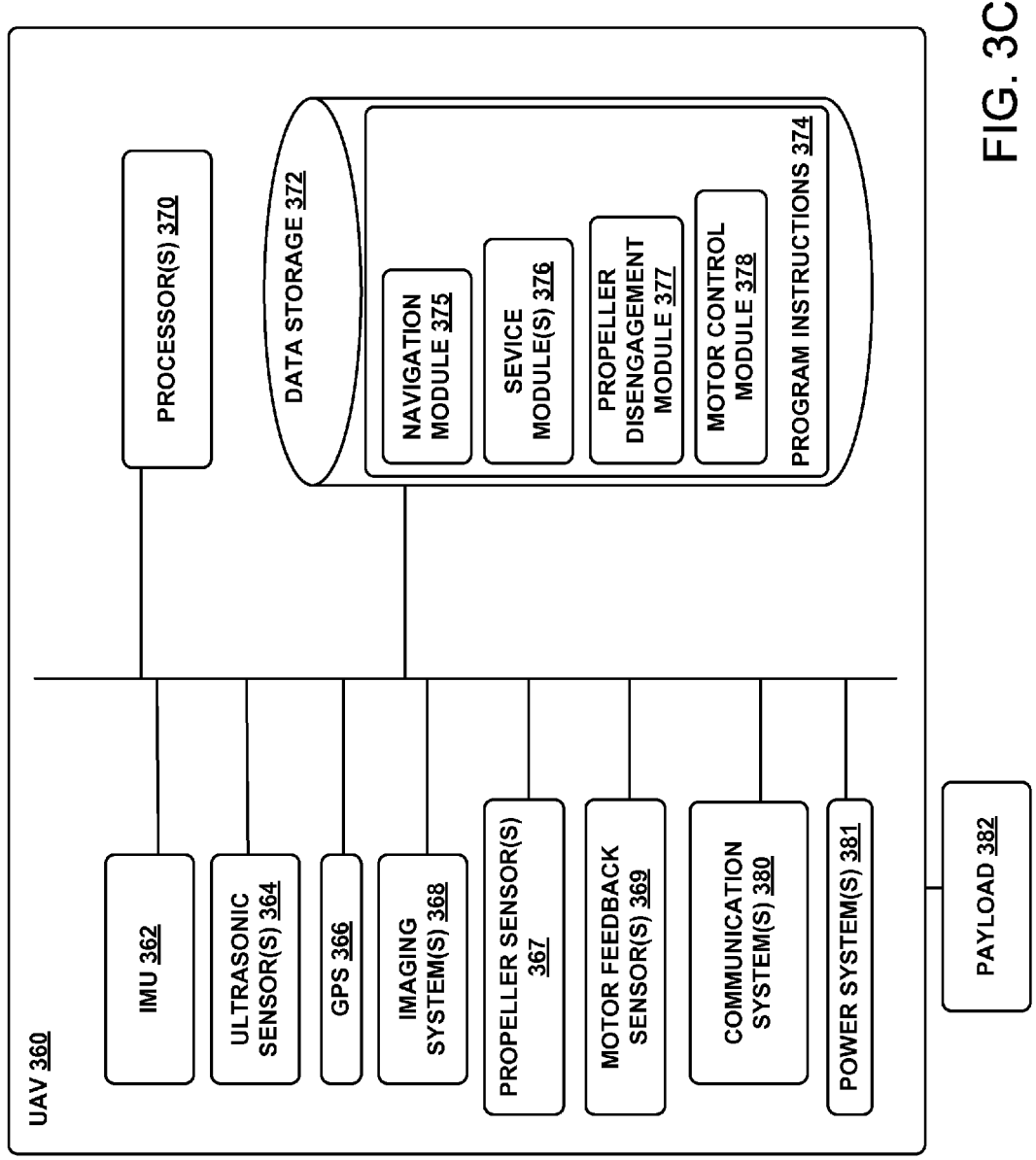
FIG. 3C is a simplified block diagram illustrating components of an unmanned aerial vehicle, according to an example embodiment.

FIG. 3C is a simplified block diagram illustrating components of a UAV 360, according to an example embodiment. UAV 360 may take the form of or be similar in form to one of the UAVs 100, 200, 300, and 350 shown in FIGS. 1, 2, 3A, and 3B. However, a UAV 360 may also take other forms.

UAV 360 may include various types of sensors, and may include a computing system configured to provide the functionality described herein. In FIG. 3C, the sensors of UAV 360 include an inertial measurement unit (IMU) 362, ultrasonic sensor(s) 364, GPS 366, imaging system(s) 368, propeller sensor(s) 367, and motor feedback sensor(s) 369, among other possible sensors and sensing systems.

In FIG. 3C, UAV 360 also includes one or more processors 370. A processor 370 may be a general-purpose processor or a special purpose processor (e.g., digital signal processors, application specific integrated circuits, etc.). The one or more processors 370 can be configured to execute computer-readable program instructions 374 that are stored in the data storage 372 and are executable to provide the functionality of a UAV described herein.

The data storage 372 may include or take the form of one or more computer-readable storage media that can be read or accessed by at least one processor 370. The one or more computer-readable storage media can include volatile and/or non-volatile storage components, such as optical, magnetic, organic or other memory or disc storage, which can be integrated in whole or in part with at least one of the one or more processors 370. In some embodiments, the data storage 372 can be implemented using a single physical device (e.g., one optical, magnetic, organic or other memory or disc storage unit), while in other embodiments, the data storage 372 can be implemented using two or more physical devices.

As noted, the data storage 372 can include computer-readable program instructions 374 and perhaps additional data, such as diagnostic data of the UAV 360. As such, the data storage 374 may include program instructions to perform or facilitate some or all of the UAV functionality described herein. For instance, in FIG. 3C, program instructions 374 include a navigation module 375, one or more service modules 376, propeller disengagement module 377, and motor control module 378.

A. Sensors

In an illustrative embodiment, IMU 362 may include both an accelerometer and a gyroscope, which may be used together to determine the orientation of the UAV 360. In particular, the accelerometer can measure the orientation of the vehicle with respect to earth, while the gyroscope measures the rate of rotation around an axis. IMUs are commercially available in low-cost, low-power packages. For instance, an IMU 362 may take the form of or include a miniaturized MicroElectroMechanical System (MEMS) or a NanoElectroMechanical System (NEMS). Other types of IMUs may also be utilized.

An IMU 362 may include other sensors, in addition to accelerometers and gyroscopes, which may help to better determine position and/or help to increase autonomy of the UAV 360. Two examples of such sensors are magnetometers and pressure sensors. Other examples are also possible. (Note that a UAV could also include such additional sensors as separate components from an IMU.)

While an accelerometer and gyroscope may be effective at determining the orientation of the UAV 360, slight errors in measurement may compound over time and result in a more significant error. However, an example UAV 360 may be able mitigate or reduce such errors by using a magnetometer to measure direction. One example of a magnetometer is a low-power, digital 3-axis magnetometer, which can be used to realize an orientation independent electronic compass for accurate heading information. However, other types of magnetometers may be utilized as well.

UAV 360 may also include a pressure sensor or barometer, which can be used to determine the altitude of the UAV 360. Alternatively, other sensors, such as sonic altimeters or radar altimeters, can be used to provide an indication of altitude, which may help to improve the accuracy of and/or prevent drift of an IMU.

In a further aspect, UAV 360 may include one or more sensors that allow the UAV to sense objects in the environment. For instance, in the illustrated embodiment, UAV 360 includes ultrasonic sensor(s) 364. Ultrasonic sensor(s) 364 can determine the distance to an object by generating sound waves and determining the time interval between transmission of the wave and receiving the corresponding echo off an object. A typical application of an ultrasonic sensor for unmanned vehicles or IMUs is low-level altitude control and obstacle avoidance, which may be helpful for reducing UAV propeller object strikes. An ultrasonic sensor can also be used for vehicles that need to hover at a certain height or need to be capable of detecting obstacles. Other systems can be used to determine, sense the presence of, and/or determine the distance to nearby objects, such as a light detection and ranging (LIDAR) system, laser detection and ranging (LADAR) system, and/or an infrared or forward-looking infrared (FLIR) system, among other possibilities.

UAV 360 also includes a GPS receiver 366. The GPS receiver 366 may be configured to provide data that is typical of well-known GPS systems, such as the GPS coordinates of the UAV 360. Such GPS data may be utilized by the UAV 360 for various functions. As such, the UAV may use its GPS receiver 366 to help navigate to the caller's location, as indicated, at least in part, by the GPS coordinates provided by their mobile device. Other examples are also possible.

UAV 360 may also include one or more propeller sensors 367. In one instance, the UAV 360 has at least one propeller sensor for each propeller of the UAV. The propeller sensors may provide data for determining whether the propeller has passively disengaged from the motor shaft of the motor of the UAV, possibly due to a propeller object strike. In one embodiment, the propeller sensor provides a propeller speed, which may be measured in revolutions per minute. However, in other embodiments, the propeller sensor provides more, less, and/or different data that is used to determine whether the propeller is disengaged from the motor shaft of the motor of the UAV 360.

UAV 360 may also include one or more motor feedback sensors 369. In one instance, the UAV 360 has at least one motor feedback sensor for each motor of the UAV. The motor feedback sensor may provide data for determining whether the propeller is passively disengaged from the motor shaft and the motor of the UAV, possibly due to a propeller object strike. In one embodiment, the motor feedback sensor provides a motor speed, which may have a unit of revolutions per minute. In one embodiment, the processor 370 receives the feedback from sensor 369 via a 0-10 VDC signal. However, other types of control signals are possible for providing data to the processor 370 from the motor feedback sensor 369. In other embodiments, the motor feedback sensor provides more, less, and/or different data that is used to determine whether the propeller is disengaged from the motor shaft of the motor of the UAV 360.

UAV 360 may also include one or more imaging system(s) 368. For example, one or more still and/or video cameras may be utilized by a UAV 360 to capture image data from the UAV's environment. As a specific example, charge-coupled device (CCD) cameras or complementary metal-oxide-semiconductor (CMOS) cameras can be used with unmanned vehicles. Such imaging sensor(s) 368 have numerous possible applications, such as obstacle avoidance, localization techniques, ground tracking for more accurate navigation (e.g., by applying optical flow techniques to images), video feedback, and/or image recognition and processing, among other possibilities.

In a further aspect, UAV 360 may use one or more imaging systems 368 to help in determining location. For example, UAV 360 may capture imagery of its environment and compare it to what it expects to see in its environment given current estimated position (e.g., its current GPS coordinates), and refine its estimate of its position based on this comparison.

In a further aspect, UAV 360 may include one or more microphones. Such microphones may be configured to capture sound from the UAV's environment.

B. Navigation and Location Determination

The navigation module 375 may provide functionality that allows the UAV 360 to, e.g., move about in its environment and reach a desired location. To do so, the navigation module 375 may control the altitude and/or direction of flight by controlling the mechanical features of the UAV that affect flight (e.g., rotors 110 of UAV 100).

In order to navigate the UAV 360 to a target location, a navigation module 375 may implement various navigation techniques, such as map-based navigation and localization-based navigation, for instance. With map-based navigation, the UAV 360 may be provided with a map of its environment, which may then be used to navigate to a particular location on the map. With localization-based navigation, the UAV 360 may be capable of navigating in an unknown environment using localization. Localization-based navigation may involve a UAV 360 building its own map of its environment and calculating its position within the map and/or the position of objects in the environment. For example, as a UAV 360 moves throughout its environment, the UAV 360 may continuously use localization to update its map of the environment. This continuous mapping process may be referred to as simultaneous localization and mapping (SLAM). Other navigation techniques may also be utilized.

In some embodiments, the navigation module 375 may navigate using a technique that relies on waypoints. In particular, waypoints are sets of coordinates that identify points in physical space. For instance, an air-navigation waypoint may be defined by a certain latitude, longitude, and altitude. Accordingly, navigation module 375 may cause UAV 360 to move from waypoint to waypoint, in order to ultimately travel to a final destination (e.g., a final waypoint in a sequence of waypoints). Module 375 may implement other navigation techniques to navigate the UAV 360.

C. Communication Systems

In a further aspect, UAV 360 includes one or more communication systems 380. The communications systems 380 may include one or more wireless interfaces and/or one or more wireline interfaces, which allow UAV 360 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network.

D. Power Systems

In a further aspect, UAV 360 may include power system(s) 381. A power system 381 may include one or more batteries for providing power to the UAV 360. In one example, the one or more batteries may be rechargeable and each battery may be recharged via a wired connection between the battery and a power supply and/or via a wireless charging system, such as an inductive charging system that applies an external time-varying magnetic field to an internal battery.

E. Payloads

A UAV 360 may employ various systems and configurations in order to transport items. In the illustrated embodiment, a payload 382 may serve as a compartment that can hold one or more items, such that a UAV 360 can deliver the one or more items to a target delivery location. For example, as shown in FIG. 1, a UAV 100 can include a compartment 135, in which an item or items may be transported. As another example, the UAV can include a pick-and-place mechanism, which can pick up and hold the item while the UAV is in flight, and then release the item during or after the UAV's descent. As yet another example, a UAV could include an air-bag drop system, a parachute drop system, and/or a winch system that is operable from high above a medical situation to drop or lower an item or items to the scene of the medical situation. Other examples are also possible.

F. Service Modules

As noted above, UAV 360 may include one or more service modules 376. The one or more service modules 376 include software, firmware, and/or hardware that may help to provide or assist in the provision of the UAV-related services.

Configured as such, a UAV 360 may provide various types of service. For instance, a UAV 360 may have stored information that can be provided to a person or persons at the target location, in order to assist the person or persons in various ways. For example, a UAV may include a video or audio file with instructions for performing some task, which the UAV can play out to a person at the target location.

In some embodiments, a UAV 360 may facilitate communication between a layperson and/or medical personnel at the scene and medical personnel at a remote location. As an example, a service module 376 may provide a user interface via which a person at the scene can use a communication system 380 of the UAV to communicate with an emergency medical technician at a remote location. Other examples are also possible.

G. Propeller Disengagement Module and Motor Control Module

As noted above, UAV 360 may include a propeller disengagement module 377 and a motor control module 378. Module 377 detects whether a propeller has disengaged from a motor shaft of a motor of UAV 360. For a UAV with multiple propellers, module 377 also determines which propeller system has a propeller that has disengaged from the shaft mount and motor shaft of a motor for a UAV 360.

In one embodiment, processor 370 receives data from sensors 367 and 369. Data from sensor 367 is used to determine a propeller speed while data from sensor 369 is used to determine a motor speed. In one embodiment, module 377 compares the determined propeller speed and motor speed to determine if the propeller is disengaged from the motor. If the determined propeller speed is different from the determined motor speed by more than a predetermined disengagement threshold, then the module 377 determines that the propeller is disengaged from the motor shaft of a motor for UAV 360. In one embodiment, the predetermined disengagement threshold is 10%. In other embodiments, the threshold is greater than, less than, or different from 10%.

For a UAV with multiple propellers, the processor 370 determines which propeller system has a disengaged propeller based on sensors 367 and 369. In particular, each sensor 367 and 369 is associated with a particular motor and/or propeller. Thus, processor 370 can determine which propeller is disengaged based on sensors 367 and 369. In other embodiments, module 377 may determine propeller disengagement using different data, calculations, determinations, and/or methods.

In another embodiment, module 377 may determine propeller disengagement based on a magnetic element disengagement sensor (not displayed). When the propeller magnetic element attaches to and engages the shaft mount magnetic element, the magnetic elements may create a circuit (e.g., by using a jumper across the propeller mounted magnetic element). As a result, when the propeller magnetic element detaches from and disengages the shaft mount magnetic element, the circuit is broken. The disengagement sensor monitors whether or not the circuit is broken. If the disengagement sensor senses that the circuit is broken, then the module 377 determines that the propeller is disengaged from the motor. Alternatively, if the disengagement sensor senses that the circuit has been made, then module 377 determines that the propeller is engaged with the motor. Additionally, for a UAV with multiple propellers, each propeller may have a corresponding disengagement sensor. Thus, processor 370 may determine if a propeller is disengaged from a motor based on the corresponding disengagement sensor for the propeller. However, other embodiments of the disengagement sensor are possible.

Module 378 determines how to adjust motor operation based on the propeller disengaging from the motor shaft of the motor of UAV 360. Module 378 communicates with module 377 to determine which, if any, propeller has disengaged from the motor shaft of motor for UAV 360. When module 378 receives an indication from module 377 that a propeller is disengaged, module 378 may alter control of one or more motors of UAV 360 in response to the detected propeller disengagement.

In one embodiment, module 378 may adjust the control signal to other motors that remain engaged with their respective propellers. In particular, module 378 may adjust the control of motors engaged with their respective propellers to first stabilize the UAV, and then move the UAV away from the object causing the propeller object strike that resulted in propeller disengagement. In other words, module 378 controls the other motors engaged with the respective propellers to compensate for the motor that is disengaged with its respective propeller, and then move away from the object causing propeller disengagement. By moving away from the object, module 378 may allow the disengaged propeller to reengage the corresponding motor, which permits UAV flight to resume pre-disengagement operation.

In another embodiment, in response to receiving a propeller disengagement indication from module 377, module 378 may disable one or more engaged motors from their respective propellers as a safety measure. By disabling one or more motors, module 378 may discontinue flight of UAV 360 to prevent any further damage to one or more propellers, motors, objects, or the UAV 360 due to a propeller object strike. Alternatively, by disabling one or more motors, module 378 may discontinue flight of UAV 360 until one or more propellers are reengaged with their respective motors. If re-engagement of all propellers occurs, module 378 may then resume pre-disengagement operation of all motors to continue flight of UAV 360. Module 378 may communicate with module 375 to control the motors of UAV 360. In other embodiments, module 378 may adjust control of one or more motors for UAV 360 in response to propeller disengagement using different methods from the methods described above.

IV. ILLUSTRATIVE MAGNETIC PROPELLER SAFETY DEVICE

Figure 4A:
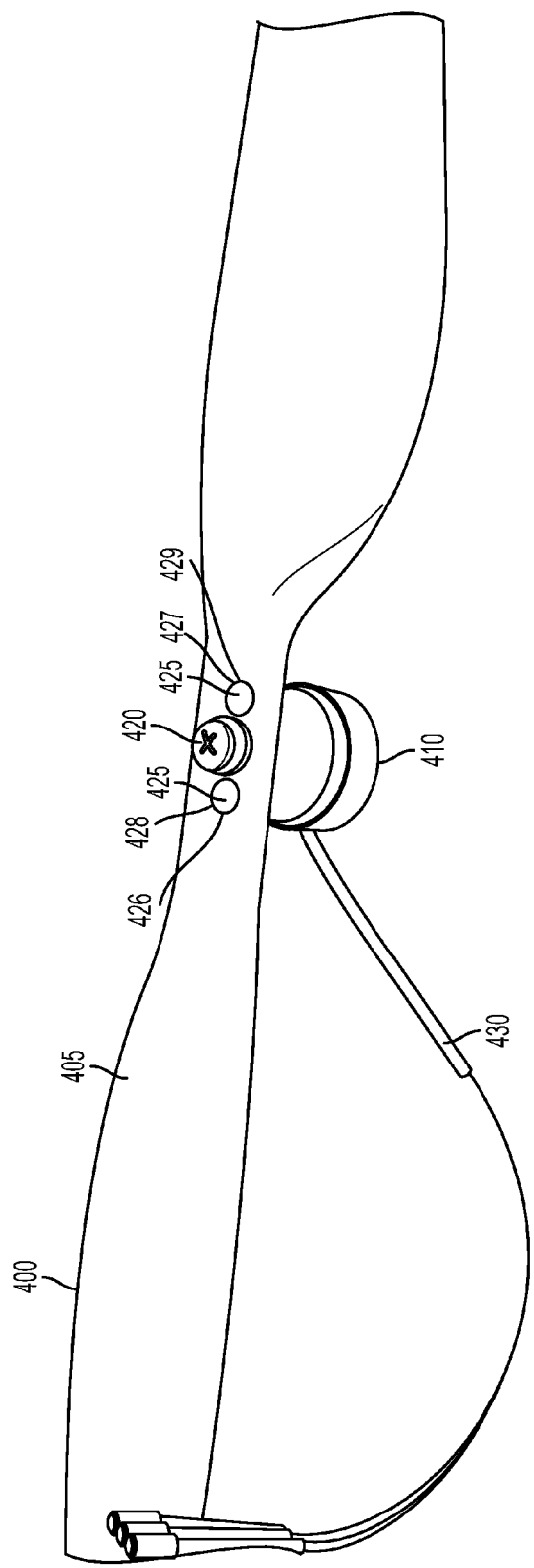
FIGS. 4A and 4B are simplified illustrations of the magnetic propeller safety device, according to an example embodiment.
Figure 4B:
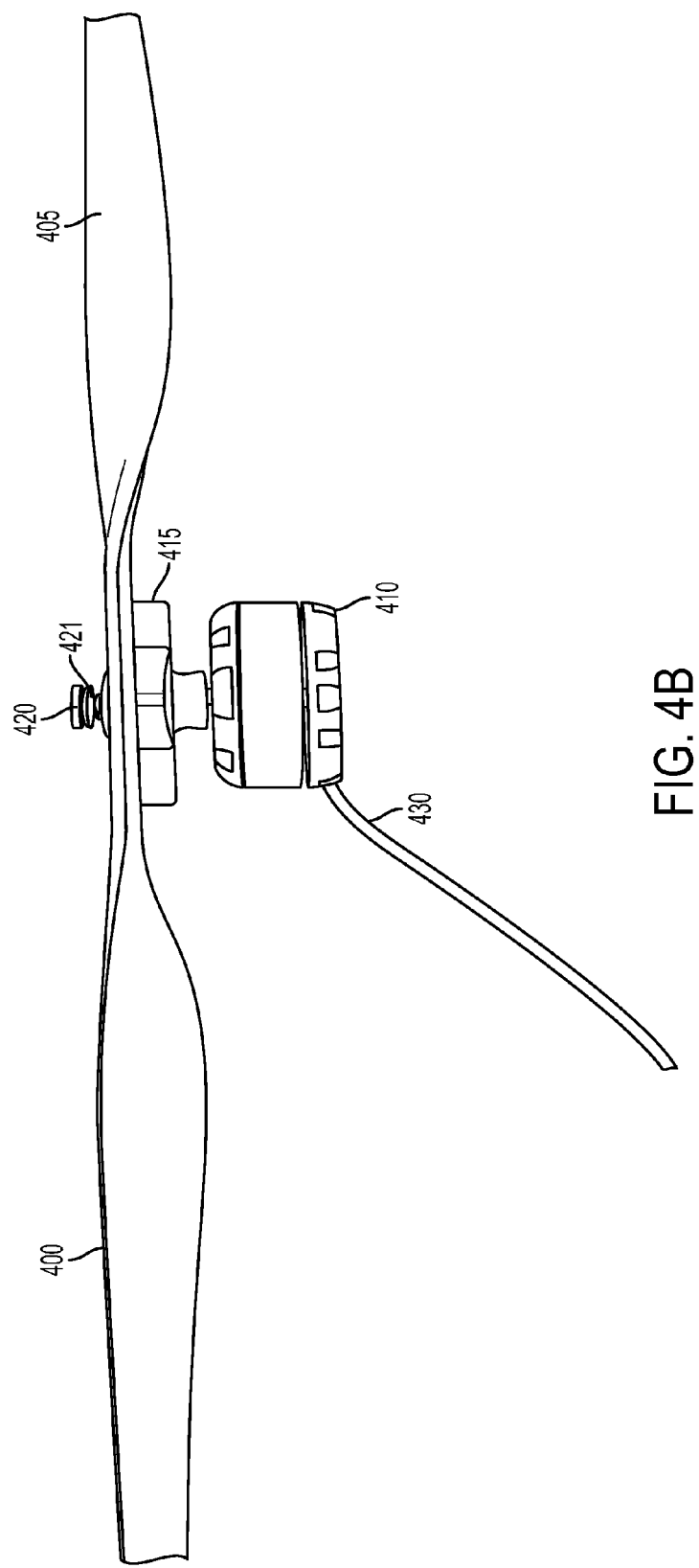

FIGS. 4A and 4B display simplified illustrations of the magnetic propeller safety device, according to an example embodiment. In the displayed embodiments, the magnetic propeller safety device 400 includes a propeller 405, a motor 410, a shaft mount 415, a screw 420, a washer 421, a propeller magnetic element 425, a first propeller magnet 426, a firs propeller magnet adapter 427, a second propeller magnet 428, a second propeller magnet adapter 429, and a motor wire 430. In other embodiments, the magnetic propeller safety device 400 may include more parts, fewer parts, and/or different parts than the parts shown in FIGS. 4A and 4B.

The motor 410 may provide torque to the magnetic propeller safety device 400 to enable the propeller 405 to rotate during UAV flight. In the displayed embodiments, the motor 410 includes a motor wire 430 and a motor shaft (not displayed) to provide torque to the device 400. One end of the wire 430 may be connected to the actual phases of the motor winding for motor 410. The other end of the motor wire 430 may be connected to hardware of the UAV (not displayed) to provide power and/or a speed control signal to the motor 410. The UAV hardware may include a power source, such as a battery, and/or an electronic speed controller that provides a control signal to the motor.

While power allows the motor 410 to operate, a speed control signal may be used to control operation of the motor 410, and thus device 400. For example, a control signal could include a modulating signal to control the speed at which the motor shaft rotates. The speed control signal could be a 0-10V signal, or a different signal to provide modulating control of the motor shaft rotation speed. The motor shaft rotation speed may determine the propeller rotation speed during UAV flight.

Additionally, the speed control signal could include a binary signal to enable and disable the device 400 (on/off control). The binary control signal could be a 24 VAC signal, or a different binary control signal for the motor 410. Alternatively, the wire 430 may provide only power and no control signal. For example, power may be used to enable and disable the motor 410 without providing any modulating control. The power signal could be 24 VAC, or a different signal to power the motor. In other embodiments, wire 430 may be used for different purposes to enable operation of the motor 410.

The motor 410 may provide torque to the magnetic propeller safety device 400 by way of a motor shaft of the motor 410. In the displayed embodiment, the motor 410 is physically coupled to the shaft mount 415 by inserting the motor shaft of motor 410 into the shaft mount 415. Consequently, when the motor 410 causes the motor shaft to rotate, the shaft mount 415 also rotates. Because the propeller 405 can engage the shaft mount 415 during UAV flight, the rotation of the shaft mount 415 allows the propeller 405 to rotate in conjunction with the motor shaft of motor 410. Thus, the motor 410 provides torque to the device 400 to enable the propeller 405 to rotate during UAV flight. The motor 410 could be a brushed or a brushless motor.

Device 400 may also include screw 420 and washer 421. Screw 420 is inserted into washer 421, shaft mount 415, and propeller 405. The screw 420 may be used to help maintain the propeller shaft mount assembly. In particular, the screw 420 may help prevent the propeller from ejecting off of the device 400 during UAV flight. Further, the screw 420 may help ensure that the propeller 405 can engage the shaft mount 415 during UAV flight. The washer 421 is in contact with the screw 420 and the shaft mount 415 when the screw 420 is tightened. The washer 421 may help prevent the screw from damaging the shaft mount 415 and the propeller 405 when the screw 420 is tightened.

Figure 5:
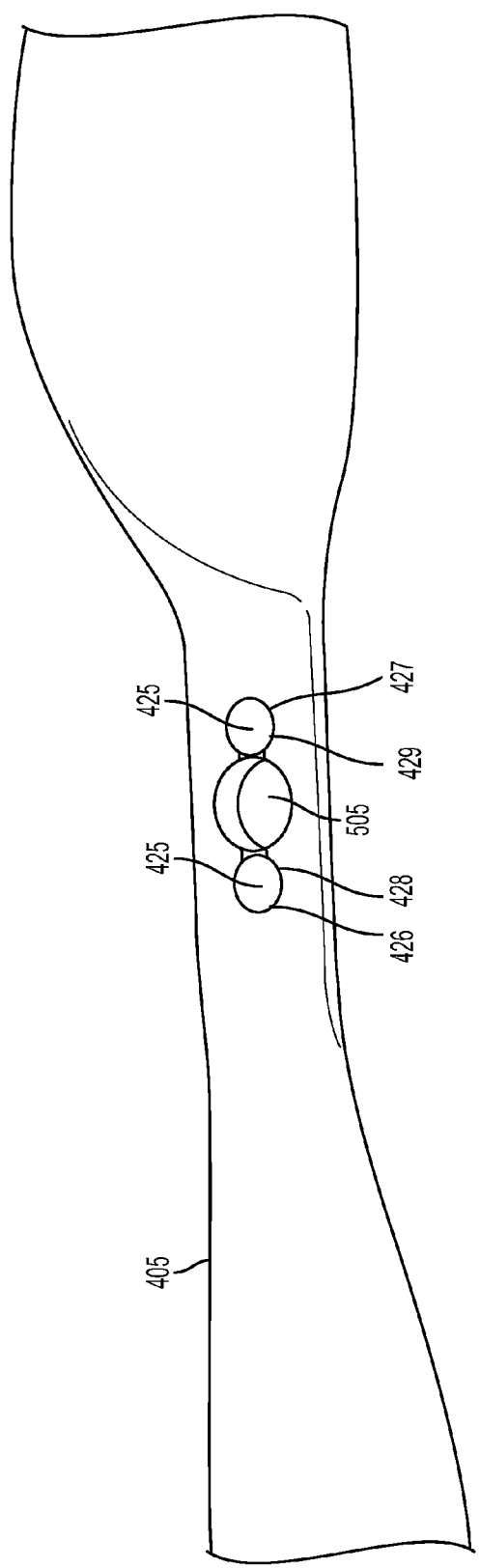
FIG. 5 is a simplified illustration of a propeller for the magnetic propeller safety device, according to an example embodiment.

In the displayed embodiment, washer 421 is press fit into propeller hole 505 (discussed in FIG. 5). In some embodiments, the washer 421 may be a compressible washer. In some embodiments, the washer 421 may have a mechanical element that allows the washer to deform and press through the propeller hole 505. For example, a washer 421 may use a mechanical spring element and/or a C-Clip to deform and press through the propeller hole 505. In other embodiments, device 400 may use more, less, and/or different parts to maintain the propeller shaft mount assembly.

In the displayed embodiment of FIGS. 4A and 4B, the motor 410, motor wire 430, screw 420, and washer 421 may be off-the-shelf parts. Alternatively, in other embodiments, one or more of the motor 410, the motor wire 430, the screw 420, and the washer 421 may be custom-designed parts that are fabricated to meet the needs of a particular UAV.

V. ILLUSTRATIVE MAGNETIC PROPELLER SAFETY DEVICE COMPONENTS

FIG. 5 displays a simplified illustration of a propeller for the magnetic propeller safety device, according to an example embodiment. In the displayed embodiment, propeller 405 includes a propeller hole 505 and a propeller magnetic element 425, which includes a first propeller magnet 426, a second propeller magnet 427, a first propeller magnet adapter 428 and a second propeller magnet adapter 429. In other embodiments, the propeller 405 may include more parts, fewer parts, and/or different parts than the part shown in FIG. 5.

The propeller 405 provides a thrust force to propel the UAV during flight, as mentioned earlier in FIGS. 1-3B. Propeller 405 provides a thrust force by rotating with the motor shaft of motor 410 along a longitudinal motor shaft axis (not displayed). The propeller 405 can rotate in conjunction with the motor shaft by engaging the shaft mount 415.

Figure 6A:
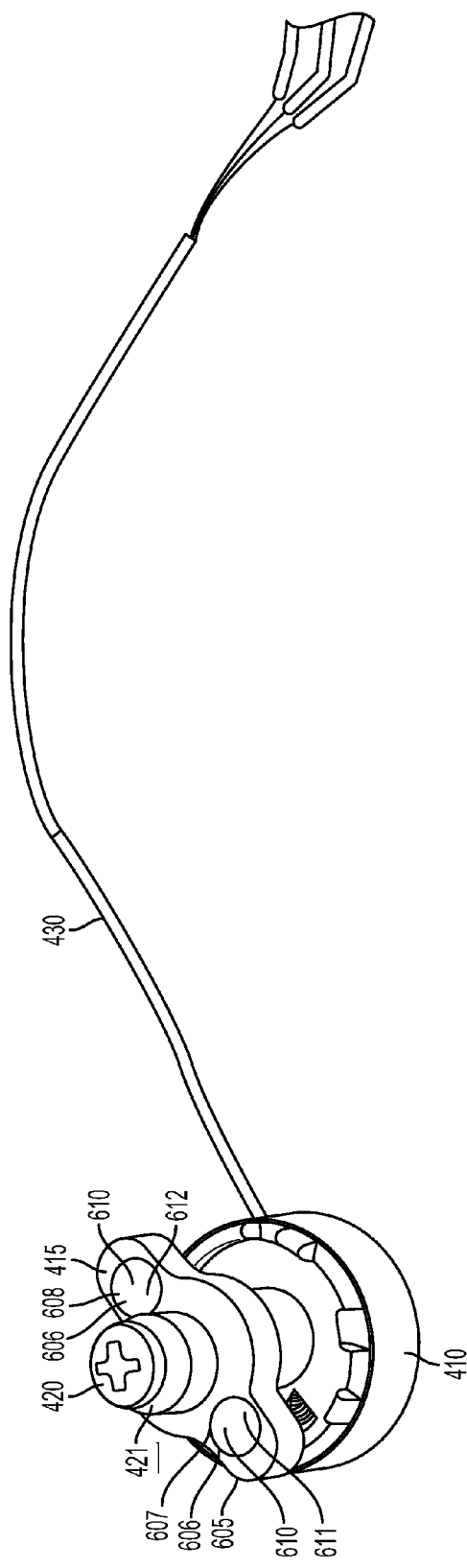
FIGS. 6A and 6B are simplified illustrations of a shaft mount motor assembly for the magnetic propeller safety device, according to an example embodiment.
Figure 6B:
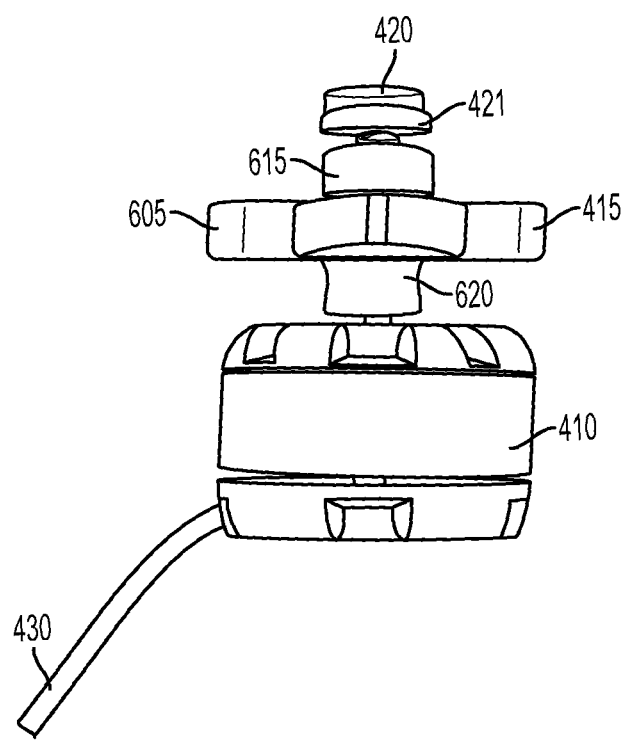

In the displayed embodiment, the propeller 405 can engage and disengage the shaft mount 415 by way of magnetic forces imparted between the propeller magnetic element 425 and the shaft mount magnetic element 610 (discussed in FIGS. 6A and 6B). When the propeller 405 is disengaged from the shaft mount 415 during UAV flight (e.g., due to a propeller object strike), the propeller 405 remains attached to the magnetic propeller safety device 400 by way of the shaft mount 415, and possibly the screw 420, and washer 421.

By remaining attached to the device 400, the propeller 405 can reengage with the shaft mount 415 to resume UAV flight. This may be an improvement over other propeller designs in which the propeller ejects from the aircraft in response to a propeller object strike. The propeller and shaft mount are discussed in further detail in FIGS. 6A-8.

Propeller 405 includes propeller hole 505. Hole 505 is located at the center of the propeller 405 to ensure that the weight of the propeller is radially balanced with respect to the motor shaft. Propeller 405 is attached to the device 400 by inserting the press fit locking end 615 (discussed further in FIGS. 6A-7) of shaft mount 415 through hole 505. Furthermore, the screw 420 is inserted through washer 421 and into the press fit locking end 615 of shaft mount 415. The screw 420 is then tightened to ensure that the propeller 405 remains attached to the propeller safety device 400, especially during UAV flight.

In the displayed embodiment of FIG. 5, the propeller 405 and propeller magnetic element 425 may be off-the-shelf parts. Alternatively, in other embodiments, the propeller 405 and magnetic element 425 may be custom-designed parts that are fabricated to meet the needs of a particular UAV. In the displayed embodiment, the propeller 405 is an off-the-shelf part that is altered on opposite ends of the hole 505 along the longitudinal axis (not displayed) of the propeller 405 to include propeller magnet adapters 428 and 429.

Adapters 428 and 429 permit the first and second propeller magnets 426 and 427, respectively, to be incorporated into propeller 405. In one embodiment, the magnets 426 and 427 are fastened to propeller 405 via an adhesive applied to the surfaces of the corresponding magnet adapters 428 and 429 and/or the surfaces of the magnets 426 and 427. The adapters 428 and 429 may be holes in the propeller. Alternatively, the adapters 428 and 429 may be notches cut out of the propeller along the propeller surface that contacts the shaft mount mounting plate 605 (discussed with FIGS. 6A-7). The adapters 428 and 429 may be sized to be slightly larger than magnets 426 and 427, respectively, to ensure that the magnets fit in adapters 428 and 429. Alternative adapters 428 and 429 may be possible. In other embodiments, the propeller magnetic element 425 may be incorporated into propeller 405 via different methods.

FIGS. 6A and 6B display simplified illustrations of a shaft mount motor assembly for the magnetic propeller safety device, according to an example embodiment. In the displayed embodiment, the shaft mount motor assembly 600 includes motor 410, shaft mount 415, screw 420, and/or washer 421. The shaft mount 415 includes a shaft mount mounting plate 605, a shaft mount magnetic element adapter 606, a shaft mount first magnet adapter 607, and a shaft mount second magnet adapter 608, a shaft mount magnetic element 610, a shaft mount first magnet 611, a shaft mount second magnet 612, a shaft mount press fit locking end 615, and a shaft mount motor shaft adapter 620. In some embodiments, the assembly 600 and/or shaft mount 415 may include more parts, fewer parts, and/or different parts than the parts shown in and/or described for FIGS. 6A and 6B.

In the displayed embodiment of FIGS. 6A and 6B, the motor 410 is connected to the shaft mount 415 to enable the shaft mount to rotate with the motor shaft, which in turn may allow the propeller 405 to also rotate with the motor shaft. The motor shaft of motor 410 is inserted into the shaft mount motor shaft adapter 620. Additionally, screw 420 is inserted into washer 421 and the press fit locking end 615 of shaft mount 415. The screw 420 is then tightened and washer 421 may help distribute the load of the screw and prevent the screw 420 from damaging the shaft mount 415 and/or the press fit locking end 615 during tightening.

In one embodiment, the screw 420 may be inserted into washer 421 and press fit locking end 615 of shaft mount 415. The screw may then be tightened against the motor shaft of motor 400 to better fasten the motor 410 to the shaft mount 415. However in other embodiments, the motor 410 may be connected to shaft mount 415 using different methods.

Figure 7:
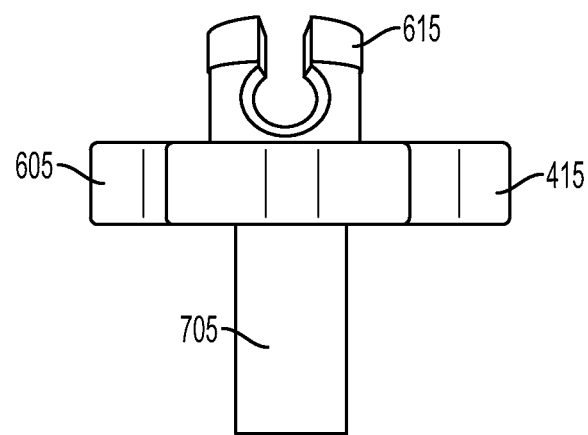
FIG. 7 is a simplified illustration of a shaft mount for the magnetic propeller safety device, according to an example embodiment.

FIG. 7 displays a simplified illustration of a shaft mount for the magnetic propeller safety device, according to an example embodiment. In the displayed embodiment, the shaft mount 415 includes a shaft mount mounting plate 605, a shaft mount press fit locking end 615, and an extended shaft mount motor shaft adapter 705. The shaft mount 415 in FIG. 7 may also include parts that are not displayed, including a shaft mount magnetic element adapter 606, a shaft mount first magnet adapter 607, a shaft mount second magnet adapter 608, a shaft mount magnetic element 610, shaft mount first magnet 611, and a shaft mount second magnet 612. In some embodiments, the shaft mount 415 may include more parts, less parts, and/or different parts than the parts shown and/or described for FIG. 7.

The shaft mount 415 enables the propeller 405 to rotate in conjunction with the motor shaft of motor 410 during UAV flight. The propeller 405 rotates in conjunction with the motor shaft of motor 410 when the propeller engages the shaft mount 415 by way of a magnetic holding force exerted between the propeller magnetic element 425 and shaft mount magnetic element 610. Additionally, if the propeller 405 disengages the shaft mount during UAV flight (e.g., due to a propeller object strike), the shaft mount 415 may reengage the propeller 405 when the propeller object strike ends and the propeller magnetic element 425 is aligned with the shaft mount magnetic element 610.

The shaft mount 415 also allows the propeller 405 to remain connected to the device 400 via the press fit locking end 615. In particular, if a propeller object strike occurs, the press fit locking end 615 prevents the propeller 405 from ejecting off of the shaft mount 415 and device 400. Thus, the press fit locking end 615 of the shaft mount 415 helps retain the propeller 405 during a propeller object strike. By retaining the propeller 405 during a propeller object strike, and re-engaging the propeller 405 after a propeller object strike, the shaft mount 415 helps permit UAV flight to continue, despite a propeller object strike.

The extended adapter 705 may be used to permit the motor 410 to attach to the shaft mount 415. In particular, the motor shaft of motor 410 may be inserted into adapter 705. In one embodiment, inserting the shaft of motor 410 into adapter 705 causes the adapter to compress, such that adapter 705 resembles adapter 620 in FIGS. 6A and 6B. Alternatively, extended adapter 705 may be shortened, trimmed, and/or sized to resemble adapter 620 to better accommodate the motor shaft of motor 410. However, other adapters or methods may be used to connect motor 410 to shaft mount 415.

Figure 8:
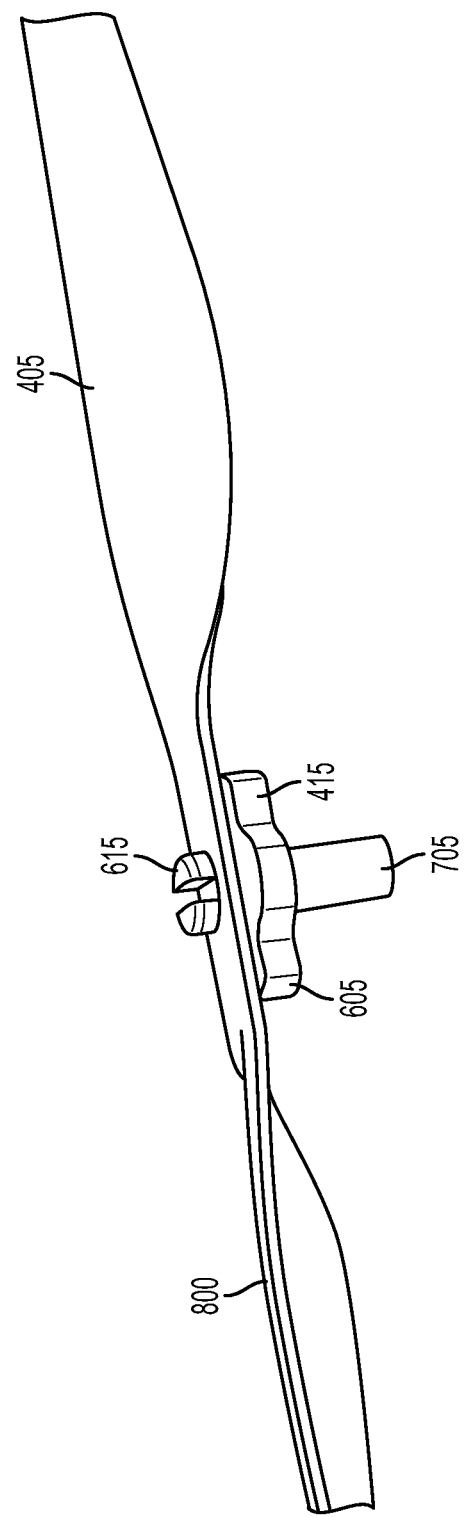
FIG. 8 is a simplified illustration of a propeller shaft mount assembly for the magnetic propeller safety device, according to an example embodiment.

FIG. 8 displays a simplified illustration of a propeller shaft mount assembly for the magnetic propeller safety device, according to an example embodiment. In the displayed embodiment, the propeller shaft mount assembly 800 includes propeller 405, shaft mount 415, shaft mount mounting plate 605, shaft mount press fit locking end 615, and extended shaft mount motor shaft adapter 705. The assembly 800 may also include other parts that are not displayed, including propeller magnetic element 425, propeller first magnet 426, propeller second magnet 427, propeller magnet adapters 428 and 429, the propeller hole 505, shaft mount magnetic element adapter 606, shaft mount magnet adapters 607 and 608, shaft mount magnetic element 610, shaft mount first magnet 611, and shaft mount second magnet 612. In some embodiments, the propeller shaft mount assembly 800 may include more parts, less parts, and/or different parts than the parts shown and/or described for FIG. 8.

Assembly 800 includes a shaft mount 415 inserted through the center of the propeller 405 by inserting the press fit locking end 615 into the propeller hole 505. The press fit locking end 615 can be compressed for insertion into the propeller hole 505. Once the press fit locking end 615 is compressed, inserted, and is clear of the hole 505, the press fit locking end expands and snaps into place. As a result, the propeller 405 is located between the press fit locking end 615 and the mounting plate 605, as shown in FIG. 8. When the propeller 405 is disengaged from the shaft mount 415, the propeller 405 can move along the shaft mount 415 between the press fit locking end 615 and the mounting plate 605. In other embodiments, the propeller 405 may connect to the shaft mount 415 using different parts and/or methods.

Although FIGS. 6A-8 display one embodiment of the press fit locking end 615, other embodiments of the press fit locking end are possible. In the displayed embodiment, press fit locking end 615 is made of plastic. Press fit locking end 615 relies on the elasticity of plastic to engage locking tabs of the press fit locking end 615 after insertion through propeller hole 505. However, in other embodiments, the press fit locking end 615 may rely on a mechanical locking element made of less elastic material (such as metal) with spring actuated locking tabs that are engaged after insertion through propeller hole 505. Furthermore, other embodiments of the press fit locking end 615 are possible.

Also, while the displayed embodiments of FIGS. 6A-8 show the press fit locking end 615 as an integral part of the shaft mount 415, in other embodiments, the shaft mount 415 could instead have a two part assembly including a rod and a cap. The rod and cap assembly could attach the propeller 405 to the shaft mount 415 and prevent the propeller 405 from ejecting from the device 400 during a propeller object strike.

The rod could be an integral part of the shaft mount 415 that is inserted into hole 505 of the propeller 405 until at least the end of the rod clears the propeller hole 505. Once the shaft mount rod is exposed on the side of the propeller 405 opposite the mounting plate 605, a cap could then be fastened to the rod. The cap could be round and sized to have a larger diameter and/or size than the propeller hole 505 to prevent the propeller 405 from ejecting from the device 400 during a propeller object strike. Once the cap is attached to the inserted rod, the propeller 405 would be located in between the shaft mount mounting plate 605 and the cap of the shaft mount 415. The cap and rod may be configured to accommodate screw 420 and washer 421. The rod may also be configured to accommodate the motor shaft of motor 410. By fastening a cap that is larger than the hole 505 to a shaft mount rod inserted through propeller hole 505, the propeller 405 may be unable to eject from device 400 during a propeller object strike. As a result, the UAV may be able to continue flight, despite a propeller object strike.

For shaft mount 415, the adapters 607 and 608 permit the first and second shaft mount magnets 611 and 612, respectively, to be incorporated into the shaft mount 415. In one embodiment, the magnets 611 and 612 are fastened to the shaft mount 415 via an adhesive applied to the surfaces of the corresponding magnet adapters 607 and 608 and/or the surfaces of the magnets 611 and 612 contacting the adapters 607 and 608. The adapters 607 and 608 may be notches in the shaft mount with dimensions slightly larger than the magnets 611 and 612. Alternative adapters 607 and 608 may be possible. In other embodiments, the shaft mount magnetic element 610 may be incorporated into the shaft mount 415 via different methods.

For the shaft mount magnetic element 610, the magnetic element magnets may be flush mounted with the surface of the mounting plate 605 at a location corresponding to the location of the propeller magnetic element magnets. For example, the locations of shaft mount magnets 611 and 612 correspond to the location of propeller magnets 426 and 427. Placing the shaft mount magnetic element 610 in a location corresponding to the propeller magnetic element 425 promotes engagement of the propeller 405 to the shaft mount 415. The propeller magnetic element magnets may also be flush mounted with the surface of the propeller 405 that contacts the surface of the shaft mount mounting plate 605.

The shaft mount magnets 611 and 612 could be larger, smaller, or the same size as the propeller magnets 426 and 427. Also, the shaft mount 415 could have more, fewer, or the same number of magnets as the propeller 405, as long as the shaft mount magnet locations correspond to the propeller magnet locations. For example, a shaft mount 415 could have two magnets located in a position corresponding to a propeller location for one propeller magnet. Thus, in this embodiment, the shaft mount has twice as many magnets as the propeller.

In the displayed embodiments of FIGS. 4A-8, the propeller 405 contains one magnet for each blade and the shaft mount 415 contains a magnet corresponding to each propeller blade magnet. Furthermore, the magnetic elements 425 and 610 have a symmetric configuration relative to the propeller hole 505. However, in other embodiments, the magnetic elements 425 and 610 may have an asymmetric configuration.

Although asymmetric magnet locations on the propeller are possible, an asymmetric propeller magnet location configuration has drawbacks. For any propeller magnet configuration, the weight of the propeller magnets must be radially balanced with respect to the center of the propeller. Also, the magnetic force must be equal for each blade of the propeller. Thus, to ensure a radially balanced propeller with equal propeller blade magnetic forces, counterweights may be required for an asymmetric magnet location design. Furthermore, asymmetric magnet locations may not encourage propeller re-engagement with the shaft mount as well as symmetric magnet locations, which is discussed later in further detail.

The shaft mount 415 may be made of an elastic material, such as plastic, or a different material. In other embodiments, the shaft mount 415 may be made of a less elastic material, such as metal, or a different material. The shaft mount may be made with off-the-shelf parts. The magnets 426, 427, 611, and 612 may be permanent magnets, electromagnetic magnets, or any other type of magnet that is suitable for the device 400. Also, the magnets 426, 427, 611, and 612 may be off-the-shelf parts. In some embodiments, one or more of the shaft mount 415 and magnets 426, 427, 611, and 612 may be custom-designed parts that are fabricated to meet the needs of a particular UAV.

The device 400 has a first magnetic element and a second magnetic element. In FIGS. 4A-8, the first magnetic element is incorporated into the propeller (e.g., propeller magnetic element 425) while the second magnetic element is incorporated into the shaft mount (e.g., shaft mount magnetic element 610). However, in other embodiments, the device 400 may include more than two magnetic elements. Also, the magnetic elements may be incorporated into components different from the propeller and motor shaft.

In one embodiment of the device 400, the motor 410 rotates at 1200 revolutions per minute (RPM). The motor shaft diameter is 4.9 millimeters (mm) while the propeller hole 505 diameter is 5 mm. The washer 421 size is 5.05 mm. For the propeller 405, the propeller rotates at the same speed as the motor (1200 rpm) with a force of 50 grams (g). The propeller weight is 3 g while the propeller diameter is 20 cm. For the magnets, each magnet is 3 mm in diameter and 1 mm thick. The total weight of the magnets (four magnets total) is 0.8 g while the total magnetic holding force of the magnetic elements is 75 g. Also, the ratio of the normal magnetic holding force to the tangential magnetic force is tuned to 10:1. Thus, a propeller object strike that disengages the propeller may have significantly less force than the normal magnetic holding force. In one example, a propeller object strike that imparts an object strike force of at least 7.5 g on the propeller in the direction opposite of propeller rotation may cause the propeller to disengage from the motor.

VI. MAGNETIC PROPELLER SAFETY DEVICE OPERATION

The magnetic propeller safety device 400 may reduce damage from a propeller object strike by using magnetic elements 425 and 610 as a passive clutch between the propeller 405 and the motor shaft of motor 410. Thus, in the event of a propeller object strike, the magnetic elements 425 and 610 allow the propeller 405 to engage, disengage, and reengage the shaft mount 415. Additionally, the shaft mount press fit locking end 615 and mounting plate 605 permit UAV flight to continue during a propeller object strike by preventing the propeller 405 from ejecting off of the device 400. The magnetic elements 425 and 610 also ease installation and improve retention of the propeller 405 with the device 400.

In the displayed embodiment of FIG. 8, the propeller 405 is engaged with the shaft mount 415. During a UAV flight, when the propeller 405 is rotating in conjunction with the motor shaft of the motor 410, the propeller 405 may be engaged with the shaft mount 415. The propeller may engage the shaft mount when the propeller magnetic element 425 and shaft mount magnetic element 610 are aligned. When the magnetic elements 425 and 610 are aligned, the magnets exert a normal magnetic holding force in a direction perpendicular to the surfaces of the mounting plate 605 and propeller 405 that come into contact (see FIG. 8). The magnetic holding force causes the magnetic elements 425 and 610 to attract each other. As a result of the magnetic holding force, the propeller 405 engages the shaft mount 415.

When engaged, the propeller 405 is magnetically connected to the shaft mount 415. In particular, when engaged, the propeller 405 may be in contact with the mounting plate of the shaft mount 605, as shown in FIG. 8. When engaged during UAV flight, the propeller 405 rotates and remains in contact with the shaft mount 415. As a result, the propeller 405 rotates in conjunction with the motor shaft of the motor 410 when the propeller 405 is engaged with the shaft mount 415.

During a propeller object strike during UAV flight, the propeller 405 (which is engaged with the shaft mount 415) may angularly displace from the shaft mount 415. A larger shear force caused by the propeller object strike causes the angular displacement of the propeller 405 from the shaft mount 415 to be larger. The shear force direction is along the surface of the mounting plate and perpendicular to the longitudinal axis of the propeller. The shear force may be perpendicular to the normal magnetic holding force. When the propeller object strike causes the propeller 405 to become angularly displaced by 5-10°, the magnetic elements 425 and 610 may become misaligned and cause the propeller 405 to passively disengage from the shaft mount 415 during the propeller object strike.

In particular, the propeller object strike shear force associated with angular displacement of 5-10° is large enough to overcome the magnetic holding force of magnetic elements 425 and 610. Specifically, the propeller object strike shear force pulls the propeller magnetic element 425 away from the shaft mount magnetic element 610 with a force that overcomes and is greater than the magnetic holding force pulling elements 425 and 610 together. As a result, the propeller object strike makes the propeller 405 disengage from shaft mount 415.

When the propeller 405 is disengaged from shaft mount 415, propeller 405 can rotate independently of the motor shaft of motor 410 during the propeller object strike. Because disengagement allows propeller 405 to rotate independently from the motor shaft of motor 410, the cumulative propeller object strike forces imparted on the propeller, object, motor shaft, and UAV are reduced. In particular, the initial propeller object strike forces on the object, propeller, motor shaft, and UAV may be similar to a propeller without the device 400. However, for device 400, the propeller object strike forces are reduced when the propeller 405 disengages from the shaft mount 415 during a propeller object strike. Thus, the cumulative propeller object strike forces imparted on the propeller, object, motor shaft, and UAV are reduced. This in turn reduces the damage incurred by the object, propeller, and UAV during a propeller object strike.

Also, the configuration of device 400 may require a lower propeller object strike disengagement force than other devices, such as a prop saver. In particular, the mechanical arrangement of the prop saver can cause the tangential force resisting rotation to be similar to the normal force resisting thrust. As a result, the disengagement force to cause the propeller to eject from the motor can be high for a prop saver. Consequently, if the propeller fails to eject during a propeller object strike, the propeller remains coupled to the motor and continues striking the object.

However, device 400 provides a lower propeller object strike disengagement force by taking advantage of the difference in normal versus tangential magnetic holding forces. In particular, the disengagement force in the direction opposite rotation of the propeller may be lower than the disengagement force for a prop saver. A lower disengagement force allows the propeller to disengage from the shaft earlier during a propeller object strike, which in turn reduces damage to the propeller, motor, and UAV. For the device 400, the difference in normal and tangential magnetic holding forces can be adjusted. In one embodiment, the ratio of normal magnetic holding force to tangential magnetic holding force is 10:1. Thus, the device 400 may further reduce damage caused during a propeller object strike by providing a lower propeller disengagement force than other devices, such as a prop saver.

Although the propeller 405 disengages from the shaft mount 415 during a propeller object strike, the propeller 405 still remains part of the device 400. As a result, UAV flight may still continue, despite the propeller object strike. In particular, the shaft mount mounting plate 605 and press fit locking end 615 prevent the propeller 405 from ejecting off of the device 400 during a propeller object strike. As a result, the propeller 405 can reengage with the shaft mount 415 once the propeller object strike is complete.

In particular, once contact between the object and the propeller has ceased, the propeller 405 may continue to spin freely and independently of the motor shaft while the propeller 405 is disengaged. However, once the magnetic elements 425 and 610 are close enough, the magnetic holding force between elements 425 and 610 may pull both elements together. This in turn may cause the propeller 405 and shaft mounts 415 to pull together. Once the propeller 405 and shaft mount 415 have pulled close enough together, the magnetic elements 425 and 610 may realign, and the propeller 405 may reengage the shaft mount 415. Specifically, once reengaged, the propeller 405 is in contact with shaft mount 415. Once the propeller 405 and shaft mount 415 reengage, the propeller 405 can rotate in conjunction with the motor shaft of motor 410. As a result of propeller re-engagement, the UAV flight may continue.

When the propeller 405 is passively disengaged from the shaft mount 415 (i.e., spinning independently from the motor shaft of motor 410), the propeller is located roughly ⅛th of an inch from the surface of shaft mount mounting plate 605. In contrast, when the propeller 405 is engaged with the shaft mount 415, the propeller is in contact with the surface of shaft mount mounting plate 605 (see FIG. 8). Thus, during passive disengagement, the propeller is free to move along the shaft mount between the press fit locking end 615 and the shaft mount mounting plate 605.

In some embodiments, the propeller may be pushed away ⅛th of an inch due to a magnetic repelling force between the magnetic elements 425 and 610. Alternatively, the propeller 405 may be located ⅛th of an inch away from the surface of shaft mount mounting plate 605 due to a reduced or nonexistent magnetic holding force between magnetic elements 425 and 610. In some embodiments, the propeller is pushed off of the surface of the shaft mount mounting plate 605 by features, such as ramps or grooves. In some embodiments, the propeller 405 may move away a different distance from mounting plate 605 during passive disengagement.

The magnetic elements 425 and 610 can be tuned or adapted to impart different magnetic normal force and tangential force strengths. In one embodiment, a ratio of normal magnetic force to tangential magnetic force is 10:1. As a result, the propeller object strike shear force required for propeller disengagement may be significantly less than the normal magnetic holding force. In one embodiment, a shear force (e.g., due to an object strike) in a direction opposite propeller rotation may only need to be ¹⁄₁₀th as strong as the normal magnetic force to overcome the tangential magnetic force and cause propeller disengagement. However, this ratio could be increased or decreased depending on the needs of the UAV, propeller, shaft mount, motor shaft, and/or the specific application of the magnetic elements.

In one embodiment, the spacer is inserted between the shaft mount mounting plate 605 and the propeller 405 to adjust the ratio of the normal magnetic force to tangential magnetic force. Inserting the spacer reduces the amount of tangential force (or object strike shear force) required to overcome the magnetic holding force to disengage the propeller from the shaft mount. Specifically, inserting the spacer increases the distance between the shaft mount 415 and propeller 405, which in turn decreases the magnetic holding force between the magnetic elements 425 and 610. Thus, the tangential force (or object strike shear force) required to disengage the propeller from the shaft mount is reduced. Other methods may be used to tune or adjust the magnetic forces and/or the magnetic forces ratio for the device 400.

In one embodiment, the propeller 405 disengages from the shaft mount 415 when the propeller is misaligned from the shaft mount 415 by a displacement amount of 5-10°. However, in other embodiments, the displacement amount required to disengage the propeller 405 from the shaft mount 415 could be smaller, larger, and/or different from 5-10°. In theory, the displacement amount could be any amount of angular displacement greater than 0°. The displacement amount, in some embodiments, may be adjusted by tuning the magnets. Alternatively, the displacement amount may be adjusted by using stronger or weaker magnets. Other methods may exist for adjusting the displacement amount.

Additionally, the magnets reduce the force required to install the propeller and increase the force required to remove the propeller. In particular, a normal magnetic holding force imparted between the propeller and a shaft mount reduces the force required for installing the propeller. Specifically, when elements 425 and 610 are close together, the elements automatically attract each other, which in turn reduces the force needed for installation. Furthermore, the same normal magnetic holding force increases the force required to remove the propeller. As a result, the magnets make it easier to install the propeller. The magnets also increase the retention force imparted by the shaft mount on the installed propeller.

The symmetric magnet location configuration of propeller 405 and shaft mount 415 allows the magnetic elements 425 and 610 to reengage at multiple propeller rotation points. For example, the two-blade propeller 405 can reengage shaft mount 415 when the propeller 405 has rotated either 180° or) 360° (0°. For a three blade propeller with a symmetric magnet location design, the propeller magnets could reengage the shaft mount at propeller rotation points of 120°, 240°, and) 360° (0°.

However, for an asymmetric magnet location design, only one location for realignment exists at a rotation of 0° (360'). Because of the asymmetrical design, each propeller magnet has only one corresponding shaft mount magnet. As a result, re-engagement can only occur when the propeller has rotated such that a propeller magnet is aligning with its corresponding shaft mount magnet.

For a symmetric design, each propeller magnet may have multiple shaft mount magnets available for realignment due to symmetry. Even further, if a shaft mount and propeller magnet configuration is symmetrical with respect to all propeller blades, then each propeller magnet can realign with any of the shaft mount magnets. Thus, a symmetric design encourages the propeller to reengage the shaft mount after a propeller object strike.

VII. ILLUSTRATIVE SHAFT MOUNTS

Figure 9A:
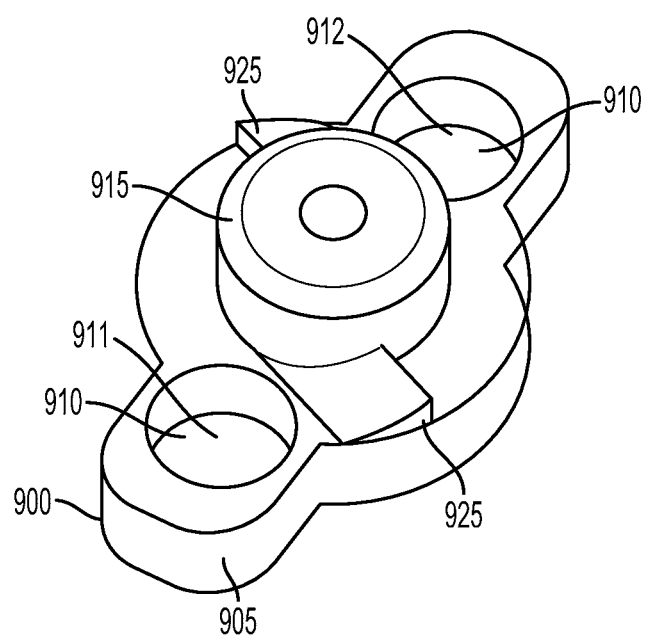
FIGS. 9A and 9B are simplified illustrations of a shaft mount for the magnetic propeller safety device, according to another example embodiment.
Figure 9B:
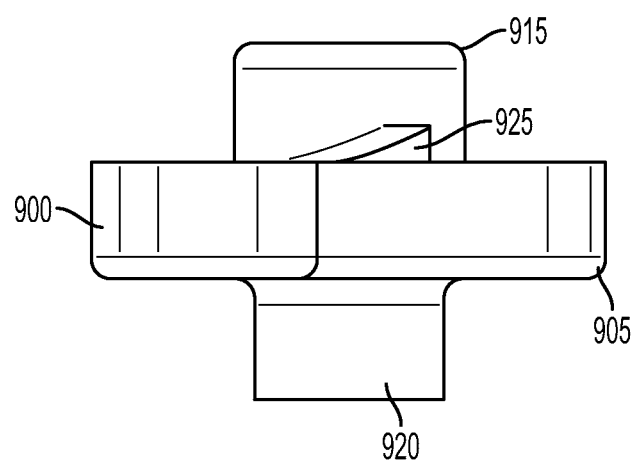
Figure 10:
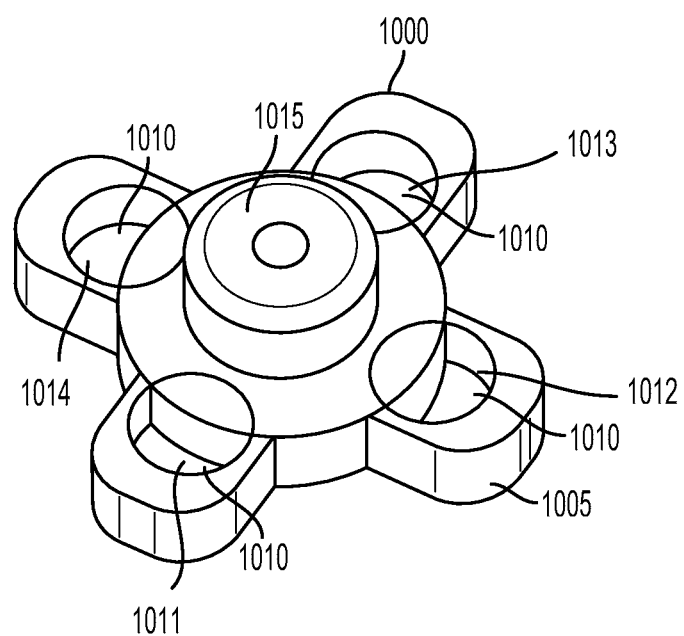
FIG. 10 is a simplified illustration of the shaft mount for the magnetic propeller safety device, according to yet another example embodiment.

FIGS. 9A, 9B, and 10 display alternative embodiments of a shaft mount for device 400. FIGS. 9A and 9B display simplified illustrations of a shaft mount for the magnetic propeller safety device, according to another example embodiment. In the displayed embodiment, the shaft mount 900 includes a mounting plate 905, a shaft mount magnetic element adapter 910, a shaft mount first magnet adapter 911, a shaft mount second magnet adapter 912, a shaft mount propeller adapter 915, a shaft mount motor shaft adapter 920, and the shaft mount ramps 925. In other embodiments, the shaft mount 900 may include more parts, fewer parts, and/or different parts than the parts shown in FIGS. 9A and 9B.

As shown in FIGS. 9A and 9B, the shaft mount 900 may include a shaft mount magnetic element adapter 910 to incorporate a shaft mount magnetic element into a surface of the shaft mount mounting plate 905. The adapter 910 may include a first shaft mount magnet adapter 911 and a second shaft mount magnet adapter 912. A first shaft mount magnet may be inserted into adapter 911 while the second shaft mount magnet may be inserted into adapter 912. The shaft mount magnetic element for 900 may operate similarly to the shaft mount magnetic element for shaft mount 415. In particular, the shaft mount magnetic element for 900 may allow the propeller 405 to engage, disengage, and reengage the shaft mount 900 via the propeller magnetic element 425.

In some embodiments, a shaft mount may include disengagement accelerators to accelerate the disengagement of a propeller from the shaft mount during a propeller object strike. Accelerating propeller disengagement during a propeller object strike may reduce damage for the object, propeller, and UAV. A disengagement accelerator accelerates propeller disengagement by increasing the normal displacement between the propeller and shaft mount magnetic elements while the angular displacement between the propeller and shaft mount magnetic elements increases. In FIGS. 9A and 9B, the shaft mount 900 includes disengagement accelerators in the form of ramps 925 located on the surface of the mounting plate 905.

During a propeller object strike, ramps 925 may cause the propeller 405 to disengage from the shaft mount 900 quicker. In particular, when the propeller object strike begins and the propeller 405 begins to displace, each blade of the propeller 405 encounters a ramp 925. When the propeller blades encounter the ramps, as the propeller angular displacement from the shaft mount continues to increase, the inclined ramps 925 force increased normal displacement between the propeller magnetic element 425 and the shaft mount magnetic element 610. As the normal displacement between the magnetic elements 425 and 610 increases at a faster rate, the magnetic holding force between elements 425 and 610 decreases at a faster rate. Because the magnetic holding force decreases more quickly, the ramps 925 may cause the propeller 405 to disengage from shaft mount 900 faster during a propeller object strike.

The propeller 405 may also include disengagement accelerator adapters to accommodate the shaft mount disengagement accelerators. For example, propeller 405 may include ramp adapters for ramps 925. The ramp adapters for a propeller 405 may be holes or notches in the propeller with dimensions similar to or slightly larger than the ramps 925. Similar or slightly larger dimensions ensure that the adapters can adequately accommodate ramps 925. In other embodiments, the disengagement accelerator adapters may have larger, smaller, or different dimensions than the ramp adapters. In other embodiments, the propeller 405 may not have disengagement accelerator adapters.

While the displayed embodiment in FIGS. 9A and 9B shows two ramps, in other embodiments, the shaft mount has more or less disengagement accelerators. Further, other embodiments of ramps may include inclines having a larger or smaller slope. Even further, the ramps may have a nonlinear incline. In other embodiments, the disengagement accelerators may be grooves, or some other configuration, as opposed to ramps. Also, while the displayed embodiment shows ramps 925 that accommodate counterclockwise displacement for a propeller rotating in a clockwise direction, other embodiments may include accelerators that accommodate clockwise displacement for a propeller rotating in a counterclockwise direction.

FIG. 10 displays a simplified illustration of the shaft mount for the magnetic propeller safety device, according to yet another example embodiment. In the displayed embodiment, the shaft mount 1000 includes a mounting plate 1005, a shaft mount magnetic element adapter 1010, a shaft mount first magnet adapter 1011, a shaft mount second magnet adapter 1012, a shaft mount third magnet adapter 1013, a shaft mount fourth magnet adapter 1014, and a shaft mount propeller adapter 1015. Although not displayed, the shaft mount 1000 may also include a shaft mount motor shaft adapter. In other embodiments, shaft mount 1000 may include more parts, fewer parts, and/or different parts than the parts shown in FIG. 10.

Unlike shaft mount 415, shaft mount 1000 can accommodate a propeller magnetic element with four magnets. Specifically, the shaft mount 1000 includes shaft mount magnetic element adapter 1010, which includes a shaft mount first magnet adapter 1011, a shaft mount second magnet adapter 1012, a shaft mount third magnet adapter 1013, and a shaft mount fourth magnet adapter 1014. A shaft mount magnet can be inserted into each of the four magnet adapters (1011-1014). Thus, shaft mount 1000 can accommodate four shaft mount magnets via adapter 1010. In the displayed embodiment, the shaft mount magnetic element 1010 has a symmetrical arrangement of the four magnet adapters 1011-1014. All four magnets inserted into the adapters 1011-1014 may have a substantially similar size, weight, and magnet strength.

Shaft mount 1000 can be used with a propeller containing four propeller blades (as opposed to propeller 405, which has two blades). Each of the four propeller blades may contain a propeller magnet at a location corresponding to the location of the shaft mount magnet. Thus, the four-bladed propeller would have four propeller magnets. In the displayed embodiment, all four propeller magnets may have a similar size, weight, and magnet strength.

In the displayed embodiment, the propeller would have four unique points where the propeller can reengage with the shaft mount, as opposed to the two re-engagement points for propeller 405 and shaft mount 415. Additional propeller re-engagement points exist because the shaft mount and propeller each have four symmetrically located magnets, all of which have a similar weight and magnet strength. Thus, in the displayed embodiment, any propeller magnet may reengage with any shaft mount magnet after a propeller object strike.

Other configurations of shaft mount 1000 are possible. For example, the magnets could have an asymmetric configuration. However, an asymmetric magnet configuration may require counterweights to ensure that 1) magnet weight is radially balanced for the propeller and 2) magnet force for each propeller blade is equal. Additionally, an asymmetric design may only have one re-engagement point. Thus, each propeller magnet may only be able to reengage with its corresponding shaft mount magnet.

In other embodiments, shaft mount 1000 may be configured to include magnets to accommodate a propeller that contains more than one magnet per propeller blade. Additionally, shaft mount 1000 may be configured differently to accommodate a propeller with more or fewer propeller blades. For example, if a propeller has three blades and one magnet for each blade, the shaft mount may be configured to have three shaft mount magnets. Other shaft mount configurations are also possible.

VIII. OTHER EMBODIMENTS

In other embodiments of the device 400, the magnetic elements for the propeller or shaft mount could have the magnets replaced with ferrous. However, at least one of the magnetic elements (either the propeller or the shaft mount) must use magnets to allow the propeller and shaft mount to couple together. For example, if the shaft mount magnetic element 610 is replaced with ferrous, then the propeller magnetic element 425 must use magnets to allow the propeller 405 and shaft mount 415 to couple together. One type of ferrous that could be used is steel. However, other types of ferrous could also be used with device 400.

In other embodiments, the device 400 may include a rotation limiter, such as hard stops, to limit the rotation of the propeller 405 when the propeller 405 disengages from the shaft mount 415 during a propeller object strike. In one embodiment, the hard stops are added to the shaft mount 415 and limit propeller rotation to 90° of displacement from the shaft mount 415. In other embodiments, rotation limiters, such as hard stops, may limit propeller rotation to different angular displacements. Other configurations of rotation limiters may be possible.

Although rotation limiters, such as hard stops, may not mitigate as much damage during an object strike, rotation limiters may better promote continued UAV flight after a propeller object strike. Specifically, because a rotation limiter prevents the propeller 405 from spinning freely after disengaging from the shaft mount 415, the propeller 405 and/or object may incur additional damage during an object strike. However, because the propeller 405 cannot spin freely when it disengages, the propeller 405 is more likely to reengage with the shaft mount 415, and thus continue flight of the UAV.

In some applications, it may be preferred to trade off damage mitigation for better UAV flight. For example, in a warehouse application, the most likely propeller object strikes may be warehouse walls. As a result, it may be preferable to trade off damage mitigation for better flight performance. Thus, rotation limiters, such as hard stops, may be a good option for a warehouse UAV flight application. However, this may not be the case for all applications.

IX. CONCLUSION

While the methods described herein illustrate a number of blocks that are in a sequential order, these blocks may also be performed in parallel or in a different order than those described herein. Also, the various blocks may be combined into fewer blocks, or divided into additional blocks. In addition, it should be understood that the flow diagrams show functionality and operation of possible implementations of the present embodiments, though other implementations are also possible. Moreover, each block in the flow diagrams may represent a module, a segment, or a portion of program code that includes one or more instructions executable by a processor for implementing specific logical functions or steps in the process. The program code may be stored on data storage.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

The invention claimed is:
1. An aerial vehicle comprising:
   at least one propeller;
   a shaft mount inserted through a center of the propeller, the shaft mount configured to physically couple and rotate with a motor shaft of the aerial vehicle, the shaft mount configured to engage the propeller to rotate with the motor shaft, the shaft mount configured to remain inserted through the center of the propeller;
   a first magnetic element incorporated with the propeller; and
   a second magnetic element incorporated with the shaft mount, wherein the second magnetic element is configured to attract the first magnetic element to engage the propeller to the shaft mount.
2. The device of claim 1, wherein the propeller engages the shaft mount when the first magnetic element and second mount magnetic element are aligned.

3. The device of claim 2, wherein the propeller disengages the shaft mount when the propeller and the shaft mount are misaligned by a displacement amount, wherein disengaging the propeller from the shaft mount allows the propeller to rotate independently of the shaft mount and the motor shaft.

4. The device of claim 3, wherein the displacement amount is at least 5 degrees.

5. The device of claim 4, the device further comprising:
a disengagement accelerator incorporated into the shaft mount that changes a rate of disengagement between the propeller and shaft mount, wherein increasing the rate reduces the displacement amount.

6. The device of claim 5, wherein the disengagement accelerator includes one or more ramps.

7. The device of claim 1, wherein the first magnetic element includes at least two magnets.

8. The device of claim 7 wherein the at least two magnets are symmetrically located on the propeller.

9. The device of claim 8 wherein the propeller has more than one reengagement point with the shaft mount.

10. The device of claim 1, the device further comprising:
a rotation limiter incorporated into the shaft mount that limits a rotation amount of the propeller when the propeller is disengaged from the shaft mount.

11. The device of claim 10, wherein the rotation limiter includes one or more hard stops.

12. The device of claim 1 wherein the second magnetic element is ferrous.

13. A propeller system comprising:
a propeller;
a shaft mount inserted through a center of the propeller, the shaft mount configured to physically couple and rotate with a motor shaft of an aerial vehicle, the shaft mount configured to engage the propeller to rotate with the motor shaft, the shaft mount configured to remain inserted through the center of the propeller;
a first magnetic element incorporated with the propeller; and
a second magnetic element incorporated with the shaft mount, wherein the second magnetic element is configured to attract the first magnetic element to engage the propeller to the shaft mount.

14. The propeller system of claim 13, wherein the propeller engages the shaft mount when the first magnetic element and second magnetic element are aligned.

15. The propeller system of claim 14, wherein the propeller disengages the shaft mount when the propeller and the shaft mount are misaligned by a displacement amount, wherein disengaging the propeller from the shaft mount allows the propeller to rotate independently of the shaft mount and the motor shaft.

16. The propeller system of claim 13, wherein the second magnetic element is ferrous.

17. An aerial vehicle comprising:
a plurality of propeller systems including a first propeller system and a second propeller system, wherein each propeller system comprises:
a propeller;
a shaft mount inserted through a center of the propeller, the shaft mount configured to physically couple and rotate with a motor shaft of an aerial vehicle, the shaft mount configured to engage the propeller to rotate with the motor shaft, the shaft mount configured to remain inserted through the center of the propeller;
a first magnetic element incorporated with the propeller; and
a second magnetic element incorporated with the shaft mount, wherein the second magnetic element is configured to attract the first magnetic element to engage the propeller to the shaft mount when the first magnetic element and the second magnetic element are aligned, wherein the propeller disengages the shaft mount when the first magnetic element and second magnetic element are misaligned;
one or more processors; and
a memory storing executable instructions.

18. The aerial vehicle of claim 17, wherein the stored executable instructions cause the one or more processors to:
detect, for one of the plurality of propeller systems, that a propeller has disengaged from a shaft mount; and
determine that the disengaged propeller and shaft mount are for the first propeller system.

19. The aerial vehicle of claim 18, wherein the stored executable instructions further cause the one or more processors to:
in response to determining, that the propeller of the first propeller system is disengaged from the shaft mount, disable the motor shaft of the second propeller system.

20. The aerial vehicle of claim 18, wherein the stored executable instructions further cause the one or more processors to:
in response to determining disengagement of the first propeller system, control the motor shaft of the second propeller system to rotate to stabilize the aerial vehicle;
control the motor shaft of the second propeller system to rotate to propel the aerial vehicle away from an object that caused disengagement of the first propeller system;
determine that the propeller of the first propeller system has reengaged the shaft mount; and
in response to determining re-engagement of the first propeller system,
control the motor shaft of the second propeller system to rotate at a speed based on re-engagement of the first propeller system.

21. The aerial vehicle of claim 17, wherein the second magnetic element is ferrous.

* * * * *